United States Patent
Nammi et al.

(10) Patent No.: US 10,700,827 B2
(45) Date of Patent: Jun. 30, 2020

(54) DOWNLINK POWER ALLOCATION WHEN NARROWBAND SYSTEM IS DEPLOYED WITHIN A WIDEBAND SYSTEM

(71) Applicant: Telefonaktiebolaget LM Ericsson (publ), Stockholm (SE)

(72) Inventors: Sairamesh Nammi, Austin, TX (US); Ali Behravan, Stockholm (SE); Dominique Everaere, Åkersberga (SE); Muhammad Kazmi, Sundbyberg (SE); Liang Zhang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 135 days.

(21) Appl. No.: 15/775,891

(22) PCT Filed: Nov. 17, 2016

(86) PCT No.: PCT/SE2016/051140
§ 371 (c)(1),
(2) Date: May 14, 2018

(87) PCT Pub. No.: WO2017/086868
PCT Pub. Date: May 26, 2017

(65) Prior Publication Data
US 2018/0331798 A1 Nov. 15, 2018

Related U.S. Application Data

(60) Provisional application No. 62/256,678, filed on Nov. 17, 2015.

(51) Int. Cl.
*H04L 5/00* (2006.01)
*H04W 52/14* (2009.01)
*H04W 52/34* (2009.01)

(52) U.S. Cl.
CPC .......... *H04L 5/0042* (2013.01); *H04L 5/0053* (2013.01); *H04L 5/0091* (2013.01);
(Continued)

(58) Field of Classification Search
CPC ... H04L 5/0053; H04L 5/0042; H04L 5/0091; H04L 5/0094; H04W 52/143; H04W 52/346
(Continued)

(56) References Cited

U.S. PATENT DOCUMENTS

2009/0086673 A1* 4/2009 Aminaka ............ H04W 74/008
                                              370/329
2010/0296470 A1* 11/2010 Heo ..................... H04L 5/0053
                                              370/329
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Base Station (BS) radio transmission and reception (Release 13)", Technical Specification, 3GPP TS 36.104 V13.1.0, Sep. 1, 2015, pp. 1-156, 3GPP, France.

(Continued)

*Primary Examiner* — Ricky Q Ngo
*Assistant Examiner* — Ellen A Kirillova
(74) *Attorney, Agent, or Firm* — Sage Patent Group

(57) ABSTRACT

A wireless communication device (12, 700) receives from a radio node (10, 500, 600) one or more parameter values indicating power allocated to one or more radio signals of a wideband transmission (14). The wideband transmission (14) operates in a wideband operating bandwidth (16). The wireless communication device (12, 700) also receives from the radio node (10, 500, 600) information about at least one of: (i) a first portion (24) of radio resources, within the wideband operating bandwidth (16), on which power indicated by the one or more parameter values is allocated; and (ii) a second portion (26) of radio resources, within the wideband operating bandwidth (16), on which power indicated by the one or more parameter values is not allocated
(Continued)

and on which a narrowband transmission (20) is transmitted. The wireless communication device (12, 700) also performs one or more radio operations based on the one or more parameter values and the received information.

21 Claims, 10 Drawing Sheets

(52) U.S. Cl.
CPC ......... *H04L 5/0094* (2013.01); *H04W 52/143* (2013.01); *H04W 52/346* (2013.01); *H04L 5/0007* (2013.01); *H04L 5/0048* (2013.01); *H04L 5/0064* (2013.01)

(58) Field of Classification Search
USPC ........................................................ 370/329
See application file for complete search history.

(56) References Cited

U.S. PATENT DOCUMENTS

| 2012/0214529 | A1* | 8/2012 | Ohta | H04W 52/343 |
| | | | | 455/509 |
| 2015/0085677 | A1* | 3/2015 | Pourahmadi | H04L 5/0041 |
| | | | | 370/252 |
| 2015/0365178 | A1* | 12/2015 | Maattanen | H04B 17/345 |
| | | | | 370/329 |
| 2016/0127097 | A1* | 5/2016 | Chen | H04L 5/0051 |
| | | | | 370/330 |
| 2017/0070323 | A1* | 3/2017 | Madan | H04W 52/04 |

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 12)", Technical Specification, 3GPP TS 36.331 V12.6.0, Jun. 1, 2015, pp. 1-449, 3GPP, France.

3rd Generation Partnership Project, "3rd Generation Partnership Project; Technical Specification Group Radio Access Network; Evolved Universal Terrestrial Radio Access (E-UTRA); Physical layer procedures (Release 12)", Technical Specification, 3GPP TS 36.213 V12.7.0, Sep. 1, 2015, pp. 1-241, 3GPP, France.

* cited by examiner

DOWNLINK POWER ALLOCATION WHEN NARROWBAND SYSTEM IS DEPLOYED WITHIN A WIDEBAND SYSTEM

This application is a 35 U.S.C. § National Phase Patent Application of International Application Number PCT/SE2016/051140, filed Nov. 17, 2016, which claims priority to U.S. Provisional Patent Application Ser. No. 62/256,678 filed Nov. 17, 2015, the entire contents of which are incorporated herein by reference.

TECHNICAL FIELD

The present application relates generally to a wireless communication system, and more particularly relates to power allocation in such a system.

BACKGROUND

In GERAN #62, a study item on "Cellular System Support for Ultra Low Complexity and Low Throughput Internet of Things" was approved. The aim was to study both the possibility of evolving the current GERAN system and the design of a new access system towards low complexity and low throughput radio access technology to address the requirements of cellular internet of things. The objectives of the study were: improved indoor coverage, support for massive number of low throughput devices, low delay sensitivity, ultra-low device cost, low device power consumption and (optimised) network architecture. As per the PCG #34 decisions, it was agreed to move the normative phase of a single "clean-slate solution" to 3GPP Long Term Evolution (LTE). This feature is called NarrowBand Internet of Things (NB-IOT).

3GPP LTE represents the project within the third generation partnership project, with an aim to improve the UMTS standard. 3GPP LTE radio interface offers high peak data rates, low delays and increase in spectral efficiencies. The LTE ecosystem supports both Frequency division duplex (FDD) and Time division duplex (TDD). This enables the operators to exploit both the paired and unpaired spectrum since LTE has flexibility in bandwidth as it supports 6 bandwidths: 1.4 MHz, 3 MHz, 5 MHz, 10 MHz, 15 MHz and 20 MHz.

The objective of this new study on NB-IOT is to specify a radio access for cellular internet of things, based to a great extent on a non-backward-compatible variant of the Enhanced Universal Mobile Telecommunications System (UMTS) Terrestrial Radio Access (E-UTRA). This variant addresses improved indoor coverage, support for massive number of low throughput devices, low delay sensitivity, ultra-low device cost, low device power consumption and (optimised) network architecture.

NB-IoT should support 3 different modes of operation:
1. 'Stand-alone operation' utilizing for example the spectrum currently being used by GERAN systems as a replacement of one or more Global System for Mobile Communications (GSM) carriers.
2. 'Guard band operation' utilizing the unused resource blocks within an LTE carrier's guard-band
3. 'In-band operation' utilizing resource blocks within a normal LTE carrier When NB-IoT is deployed as part of an existing LTE system (like in options 2 and 3), transmit power needs to be boosted in radio resources used for the NB-IoT (e.g. physical channel such as resource block) to meet the requirement of high coverage, i.e. power allocated to NB-IoT radio resource (e.g. resource block) is in general greater than the power allocated to an LTE radio resource (e.g. LTE resource block, resource element, etc). This in turn reduces the coverage of the LTE system, thereby reducing the data throughput.

SUMMARY

One or more embodiments herein facilitate the deployment of a narrowband system (e.g., NB-IoT) within a wideband operating bandwidth (e.g., an LTE operating bandwidth) without impacting the coverage of the wideband system. For example, from lab measurements, it has been observed that when the power is boosted for a NB-IoT resource block by 12 dB, the conventional LTE power is reduced by 1.8 dB. One or more embodiments herein advantageously avoid or at least mitigate this LTE power reduction, or at least the resulting throughput loss.

More particularly, embodiments herein include a method implemented by a radio node. The method comprises determining, from radio resources within a wideband operating bandwidth, a first portion of the radio resources on which power is to be allocated to one or more radio signals of a wideband transmission. The method also comprises allocating power to the one or more radio signals of the wideband transmission on the first portion of radio resources. The method further comprises signaling to a wireless communication device one or more parameter values indicating the power allocated to the one or more radio signals of the wideband transmission. The method additionally comprises signaling to the wireless communication device information about at least one of: the first portion of radio resources on which power indicated by the one or more parameter values is allocated; and a second portion of the radio resources on which power indicated by the one or more parameter values is not allocated by the radio node and on which a narrowband transmission is transmitted. The method further entails transmitting the one or more radio signals of the wideband transmission on the first portion of radio resources with the allocated power.

Embodiments further include a method implemented by a wireless communication device. The method involves receiving from a radio node one or more parameter values indicating power allocated to one or more radio signals of a wideband transmission, wherein the wideband transmission operates in a wideband operating bandwidth. The method further comprises receiving from the radio node information about at least one of: a first portion of radio resources, within the wideband operating bandwidth, on which power indicated by the one or more parameter values is allocated; and a second portion of radio resources, within the wideband operating bandwidth, on which power indicated by the one or more parameter values is not allocated and on which a narrowband transmission is transmitted. The method also comprises performing one or more radio operations based on the one or more parameter values and the received information.

In some embodiments, the one or more radio operations comprise one or more of: channel estimation, time tracking and/or frequency tracking, synchronization, demodulation or reception of a data channel, estimation of channel state information, reporting of channel state information, and performing radio measurements.

Alternatively or additionally, the wideband transmission may comprise a transmission of data and one or more reference signals. In this case, the method may further comprise determining, based on the one or more parameter values and the information received: a first power allocation comprising power allocated to the data at times when the one or more reference signals are not transmitted, per radio resource on which the data is transmitted; and/or a second power allocation comprising power allocated to the data at times when the one or more reference signals are transmitted, per radio resource on which data is transmitted. The method may then comprise performing the one or more radio operations based on the first and/or second power allocations.

In one or more of these embodiments, the method may also comprise determining a reference signal power allocation comprising power allocated to the one or more reference signals, per radio resource on which the one or more reference signals are transmitted. The method may moreover comprise determining a first power ratio comprising a ratio of the first power allocation and the reference signal power allocation, and/or determining a second power ratio comprising a ratio of the second power allocation and the reference signal power allocation. In this case, the method may comprise performing the one or more radio operations based on the first and/or second power ratios.

In any of the above embodiments, the one or more radio signals of the wideband transmission may comprise one or more reference signals. In this case, the one or more parameter values may include a parameter value that indicates power allocated to the one or more reference signals included in the wideband transmission.

In any of the above embodiments, the one or more radio signals of the wideband transmission may comprise one or more reference signals. In this case, the one or more parameter values may include a parameter value that indicates power allocated to the one or more reference signals included in the wideband transmission, per radio resource.

In any of the above embodiments, the information may include information about the second portion. For example, the information may indicate a number of radio resources included in the second portion. Alternatively or additionally, the information may indicate a location of the second portion within the wideband operating bandwidth.

In any of the above embodiments, the information may include information about the first portion. For example, the information may indicate a number of radio resources included in the first portion. Alternatively or additionally, the information may indicate a location of the first portion within the wideband operating bandwidth.

In any of the above embodiments, the information may inform the wireless communication device that the power indicated by the one or more parameter values is at least one of: allocated exclusively for transmission on the first portion; and not allocated for transmission on the second portion.

In any of the above embodiments, the wideband transmission comprises a transmission of data and one or more reference signals. In this case, the one or more parameter values may comprise: a first value for a parameter indicating power allocated to the data at times when the one or more reference signals are not transmitted; and/or a second value for a parameter indicating power allocated to the data at times when the one or more reference signals are transmitted. In some embodiments, for example, the first value is specific to the wireless communication device and the second value is specific to a cell served by the radio node.

In any of the above embodiments, the one or more parameter values may include a parameter value that indicates power allocated to data included in the wideband transmission, relative to power allocated to one or more reference signals included in the wideband transmission.

In any of the above embodiments, the wideband transmission may comprise a wideband Long Term Evolution (LTE) transmission, and the one or more parameter values may comprise values for at least one of a referenceSignalPower parameter, a $P_A$ parameter, and a $P_B$ parameter.

In some embodiments, the radio node may determine power allocated to the narrowband transmission on the second portion, and allocate power for the wideband transmission based on the determined power allocated to the narrowband transmission. In one embodiment, for instance, the wideband transmission may comprise a transmission of data and one or more reference signals, and the radio node may allocate power to the data in dependence on the determined power allocated to the narrowband transmission and allocate power to the one or more reference signals independent of the determined power allocated to the narrowband transmission.

Embodiments herein alternatively or additionally include a method implemented by a radio node for transmitting to a wireless communication device a wideband transmission comprising data and one or more reference signals. The method comprises determining power allocated to a narrowband transmission that is to be transmitted in a wideband operating bandwidth of the wideband transmission. The method also entails allocating power to the wideband transmission based on the determined power allocated to the narrowband transmission, by allocating power to the data in dependence on the determined power and allocating power to the one or more reference signals independent of the determined power. The method finally includes transmitting the wideband transmission with the power allocated to the wideband transmission.

In some embodiments, this method comprises reducing power allocated to at least some of the data by an amount that depends on the determined power allocated to the narrowband transmission.

In any of the above embodiments, the narrowband transmission may be transmitted in an in-band of the wideband transmission. Alternatively, in any of the above embodiments, the narrowband transmission may be transmitted in a guard band of the wideband transmission.

In any of the above embodiments, the wideband transmission may comprise a wideband Long Term Evolution, LTE, transmission and the narrowband transmission may comprise a narrowband Internet of Things, NB-IoT, transmission.

In any of the above embodiments, the radio node may comprise a radio base station and the wireless communication device may comprise a user equipment.

Embodiments also include corresponding apparatus, computer programs, and carriers.

Specific examples are now provided for one or more embodiments of methods in a wireless communication device (e.g., a UE) and a radio node (e.g., a network node).

A method in a first radio node serving a wireless communication device (e.g., UE) using a first RAT over a first operating bandwidth, Bw1, comprises the steps of: (i) Determining that at least one second RAT is operating over a second operating bandwidth, Bw2, using a second set of radio resources within the first bandwidth, Bw1; (ii) Determining information about the second set of radio resources; (iii) Determining based on the determined information about the second set of radio resources one or more parameters defining a transmit power for transmitting a first set of radio signals for operating the first RAT; (iv) Transmitting information about a subset radio resources in the first cell which the UE should use for computing or estimating the transmit power of the first set of signals in the first cell; and (v) Transmitting the first set of radio signals in the first cell with the determined transmit power.

In another embodiment a method in a first network node serving at least two UEs (a first and a second type of UEs) in a first cell using a first RAT over a first operating bandwidth, Bw1, comprising the steps of: (i) Determining that at least one second RAT is operating in a second cell over a second operating bandwidth, Bw2, using a second set of radio resources within the first bandwidth, Bw1; (ii) Determining a first information about a first scheme to be used by a first type of UE for computing DL transmit power used by the first network node for transmitting a first set of radio signals operating with the first RAT in the first cell, wherein the first scheme the first type of UE used only subset of radio resources within Bw1 (excluding Bw2) for computing the transmit power; (iii) Determining a second information about a second scheme to be used by a second type of UE for computing DL transmit power used by the first network node for transmitting a first set of radio signals operating with the first RAT in the first cell, wherein the second scheme the second type of UE used all radio resources in Bw1 for computing the transmit power; (iv) Transmitting the first and the second information to the first type of UE and the second type of UE respectively; and (v) Transmitting the first set of radio signals in the first cell with the determined transmit power.

The method in a UE served by a first network node in a first cell using a first RAT over a first operating bandwidth, Bw1, comprising the steps of: (i) Obtaining a first set of information from the first network node for deriving a transmit power the first network node for transmitting a first set of radio signals for operating the first RAT in the first cell; (ii) Obtaining a second set of information about a subset radio resources in the first cell which the UE should use for computing or estimating the transmit power of the first set of radio signals in the first cell; (iii) Computing the downlink transmit power of the first set of radio signals transmitted in the first cell based on the first and the second set of obtained information; and (iv) Performing one or more radio operations (e.g. reception of data channel, CSI estimation etc) based on at least the computed downlink transmit power of the first set of radio signals.

In at least some embodiments, this method further comprises: (v) Determining that at least one second RAT is operating in a second cell over a second operating bandwidth, Bw2, using a second set of radio resources within the first bandwidth, Bw1; and/or (vi) Determining the set of radio resources used for operating the second RAT over Bw2.

At least some embodiments herein provide certain advantages, e.g., in the context of LTE, such as: (i) Facilitate NB-IOT system deployed within LTE system; (ii) Impact to the coverage for the existing LTE system is minimal or zero; and/or (iii) Avoids link adaptation errors, hence there is no major impact to the data throughput.

DETAILED DESCRIPTION

Figure 1:
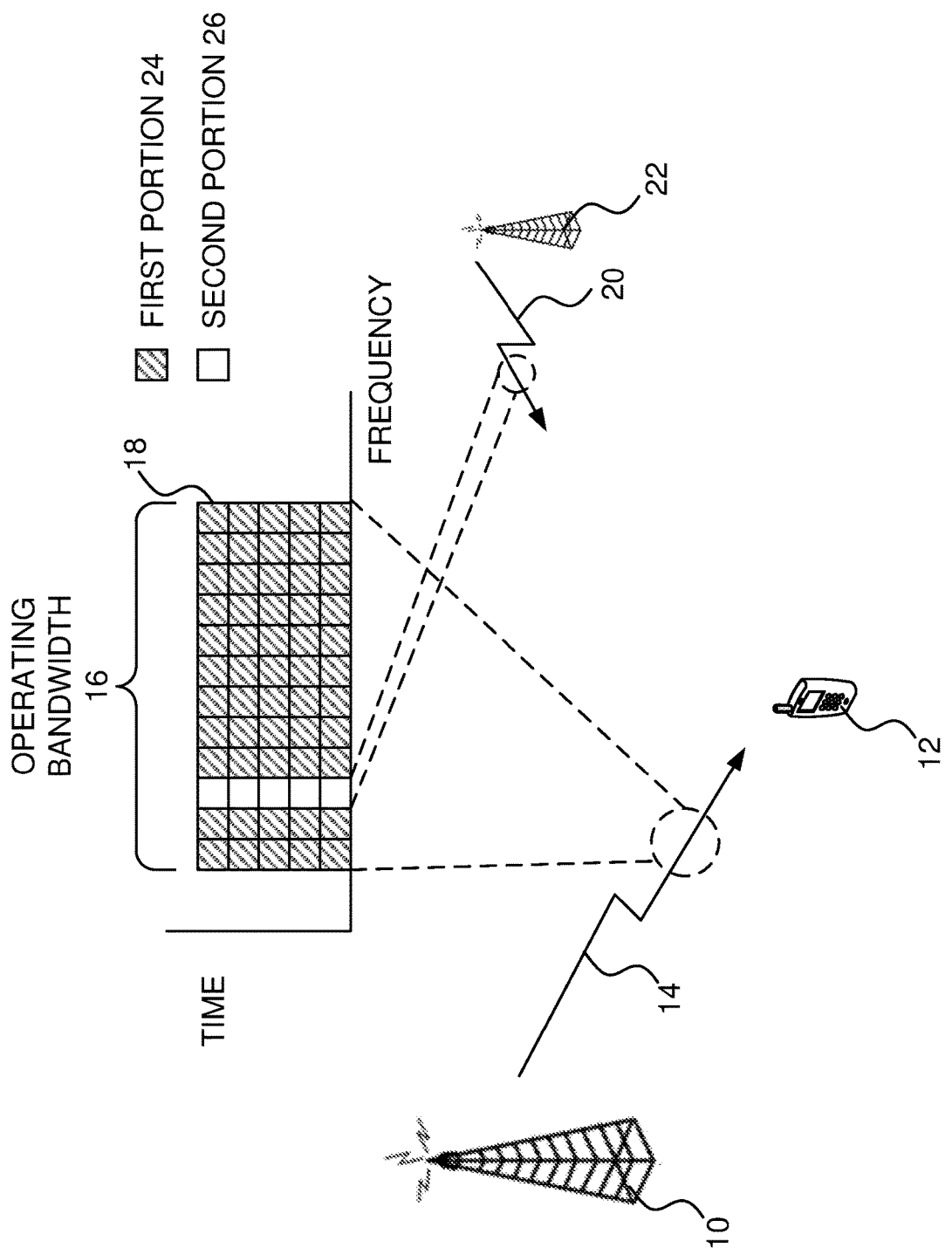
FIG. 1 is a block diagram of a wireless communication system that includes a radio node and wireless communication device according to some embodiments.

FIG. 1 illustrates a radio node 10 and a wireless communication device 12 according to one or more embodiments. The radio node 10 (e.g., a base station) is configured for transmitting a wideband transmission 14 to the device 12, such as a wideband LTE transmission. The wideband transmission 14 may include one or more radio signals, such as one or more reference signals and/or data signals. In any event, this wideband transmission 14 is made over (i.e., operates in) an operating bandwidth 16. FIG. 1 illustrates this wideband operating bandwidth 16 being spanned by multiple time-frequency radio resources 18, but any radio resources supporting a radio transmission and spanning the operating bandwidth 16 may be used by embodiments herein.

Regardless of the particular type of radio resources, a narrowband transmission 20 (e.g., a NB-LTE or IoT transmission) is transmitted in an in-band or guard-band of the wideband transmission 14, e.g., by the radio node 10 itself or by another radio node 22 as shown in FIG. 1. FIG. 1 for example generally shows that one or more radio signals of the wideband transmission 14 may be transmitted on at least a first portion 24 of the radio resources 18 within the wideband operating bandwidth 16, and one or more radio signals of the narrowband transmission 20 may be transmitted on a second portion 26 of the radio resources 18 which lies in-band of the wideband transmission 14. This first portion 24 of radio resources may therefore be referred to generally as an available portion of radio resources that is available for the wideband transmission 14, and the second portion 26 of radio resources may be referred to generally as an unavailable portion of radio resources. Indeed, in some embodiments the second portion 26 of radio resources remains unavailable for at least some radio signals of the wideband transmission 14, such as data signals, e.g., in favor of the narrowband transmission's radio signals. This may be the case even in embodiments where the second portion 26 of radio resources is nonetheless available for one or more other radio signals of the wideband transmission 14, such as reference signals. For example, in one embodiment, reference signals of the wideband transmission 14 may be transmitted on radio resources in both the first portion 24 and the second portion 26, but data signals of the wideband transmission 14 may only be transmitted on radio resources in the first portion 24. With regard to the wideband transmission's data, therefore, the first portion 24 of radio resources is available for that data whereas the second portion 26 of radio resources is unavailable for that data. In any event, FIG. 1 shows the first and second portions 24, 26 of radio resources as being distinct, non-overlapping portions of radio resources, such that the first portion 24 excludes the second portion 26. The first portion 24 may for instance include all LTE physical resource blocks in the wideband operating bandwidth 16 except for a single LTE physical resource block that corresponds to the second portion 24 configured for NB-IoT transmission.

Although FIG. 1 shows that the narrowband transmission 20 is transmitted in an in-band of the wideband transmission 14, in other embodiments not shown the narrowband transmission 20 is transmitted in a guard-band of the wideband transmission 14. That is, the second portion 26 of radio resources may lie in the wideband transmission's guard-band. In this regard, the wideband operating bandwidth 16 may include both the wideband transmission bandwidth shown in FIG. 1 as being the bandwidth within which transmission of the wideband transmission 15 is transmitted, as well as the guard-band for the wideband transmission (not shown in FIG. 1). That is, the operating bandwidth 16 may correspond to a channel bandwidth for the wideband transmission 14. Regardless, in some embodiments, the wideband transmission 14 and the narrowband transmission 20 may correspond to different radio access technologies, RATs (e.g., a first RAT and a second RAT as discussed below).

Figure 2:
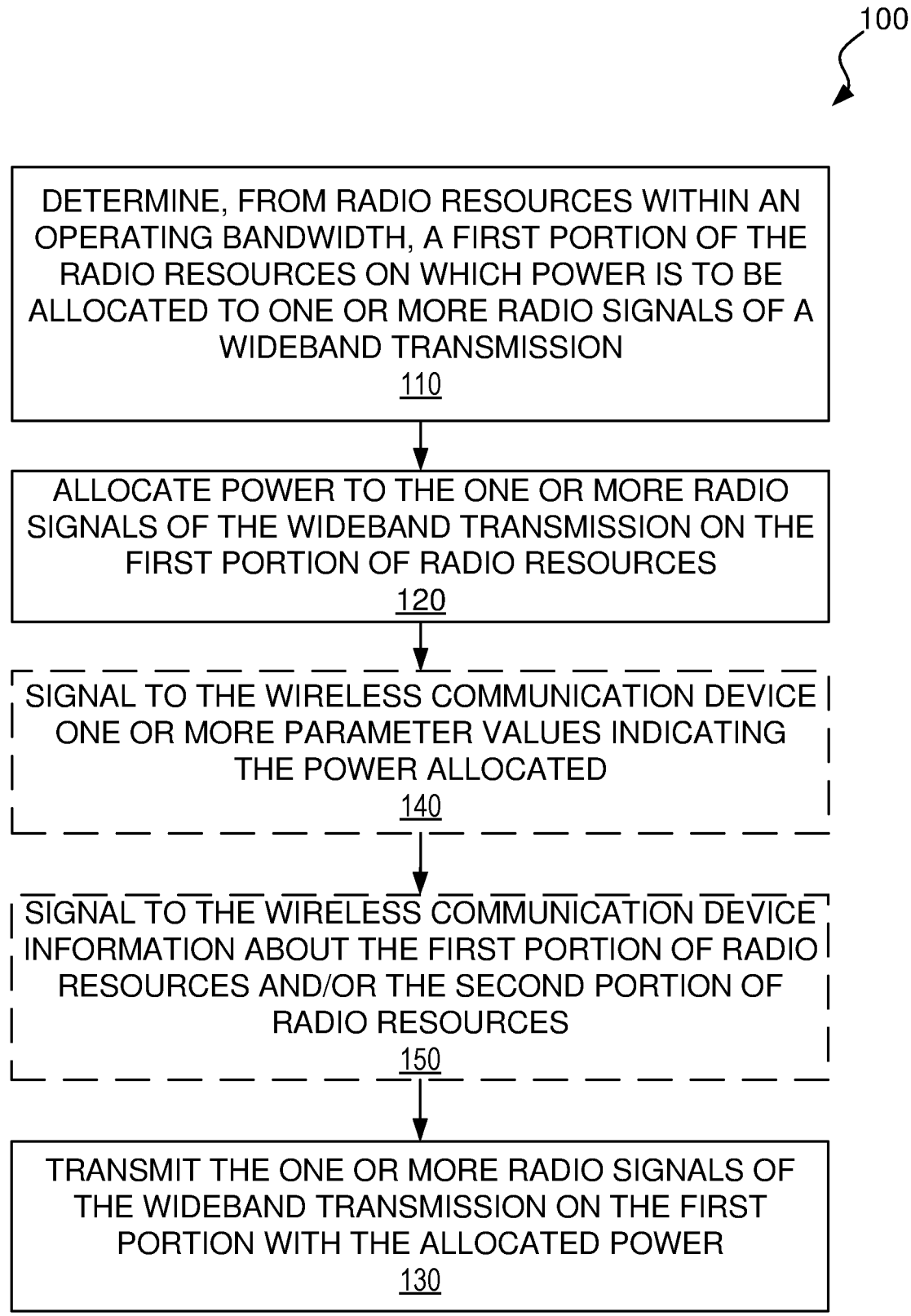
FIG. 2 is a logic flow diagram of a method performed by a radio node according to some embodiments.

FIG. 2 illustrates processing performed by the radio node 10 for allocating power for the wideband transmission 14, i.e., for allocating power for one or more radio signals of the wideband transmission 14 (e.g., reference signals). This processing 100 allocates power for the wideband transmission 14 so as to account for the narrowband transmission 20 in the wideband transmission's in-band or guard-band.

As shown, processing 100 at the radio node 10 includes determining, from radio resources 18 within the operating bandwidth 16, a first portion 24 of the radio resources 18 on which power is to be allocated to one or more radio signals of a wideband transmission 14, e.g., one or more reference signals of the wideband transmission 14 (Block 110). The power to be allocated in this step may only concern power on the first portion 24 of radio resources, not the second portion 26 of radio resources, even if the one or more radio signals of the wideband transmission 14 may also be transmitted on that second portion 26 of radio resources (i.e., allocation of power on this second portion 26 may be outside the scope of this step). In this sense, then, the power to be allocated concerns power for the one or more radio signals of the wideband transmission 14 on the first portion 24 of radio resources, exclusive of the second portion 26 of radio resources on which the narrowband transmission 20 is to be transmitted. In at least some embodiments, for example, this determination is performed based on signaling received from another node (e.g., radio node 22) indicating the radio resource(s) over which the narrowband transmission 20 is to be transmitted.

Regardless, processing 100 at the radio node 10 further includes allocating power to the one or more radio signals of the wideband transmission 14 on the first portion 24 of radio resources (Block 120). Again, power allocated in this step may only concern power on the first portion 24 of radio resources, such that power may be allocated in this step on the first portion 24, exclusive of the second portion 26 of radio resources on which the narrowband transmission 20 is to be transmitted. In fact, in some embodiments described more fully below where the one or more radio signals of the wideband transmission 14 comprise one or more reference signals, the radio node 10 may allocate power to those reference signals on the first portion 24 of radio resources independent of the power allocated to the narrowband transmission on the second portion 26 of radio resources, e.g., to preserve the wideband transmission's coverage.

Irrespective of how power allocation on the first portion 24 is performed, though, processing also includes transmitting the one or more radio signals of the wideband transmission 14 on the first portion 24 with the allocated power (Block 130).

In at least some embodiments, processing 100 also entails signaling to the wireless communication device 12 one or more parameter values indicating the power allocated to the one or more radio signals of the wideband transmission 14 (Block 140). For example, where the one or more radio signals comprise a reference signal (e.g., CRS in LTE), processing 100 may include allocating power to the reference signal on the first portion 24 of radio resources, and then signaling one or more parameter values indicating that allocated power. The one or more parameter values may for example indicate the power allocated to the reference signal per radio resource. The one or more parameter values may include for instance a referenceSignalPower parameter in LTE embodiments.

In some embodiments in this regard, the radio node 10 determines values for one or more power allocation parameters, such as referenceSignalPower, $P_A$, and/or $P_B$ in LTE), based on available transmit power at the radio node 10 for the wideband transmission 14 and the first portion 24 of radio resources 18. The radio node 10 may for instance determine the one or more parameter values by calculating available power which is not used by the narrowband transmission 20, e.g., in embodiments where transmit power is shared between the wideband transmission and the narrowband transmission 20.

According to some embodiments, the radio node 10 alternatively or additionally signals to the device information about which portion of radio resources are or are not allocated the power indicated by the one or more parameter values. In this regard, the power indicated by the one or more parameter values is allocated to the first portion 24 of radio resources. The power indicated by the one or more parameter values may not be allocated to any other portion of radio resources, including for instance the second portion 26 of radio resources on which the narrowband transmission 20 is transmitted. In some embodiments, the device 12 may be configured to derive the first portion 24 of radio resources based on identification of the second portion 26 of radio resources (e.g., as including all other resources in the operating bandwidth 16 except the second portion 26). The signaled information may thereby inform the device 12 that the power indicated by the one or more parameters is allocated exclusively for transmission on the first portion 24 of radio resources and/or is not allocated for transmission on the second portion 26 of radio resources. That is, the information may indicate on which radio resources 18 (namely, those in the first portion 24) the one or more parameter values are valid, e.g., for estimating power allocation performed by the radio node 10.

With this in mind, processing 100 at the radio node 10 in some embodiments includes signaling to the device 12 information about at least one of the first portion 24 and the second portion 26 of radio resources (Block 150). That is, the radio node 10 may signal information about the first portion 24 of radio resources on which power indicated by the one or more parameter values is allocated, and/or may signal information about the second portion 26 of radio resources on which power indicated by the one or more parameter values is not allocated and on which the narrowband transmission 20 is transmitted. This information may indicate for example the number of radio resources 18 included in the first portion 24 and/or the second portion 26.

The information may also or instead indicate the location of the first portion 24 and/or the second portion 26 within the operating bandwidth 16 (e.g., as a bitmap).

Notably, in at least some embodiments, the above described signaling advantageously enables the radio node 10 to allocate more power for the one or more radio signals of the wideband transmission 14 than without that signaling. For instance, where the one or more radio signals of the wideband transmission 14 comprise one or more reference signals (e.g., CRS in LTE), the above described signaling advantageously enables the radio node 10 to allocate more power for those one or more reference signals and thereby increase the wideband transmission's coverage. In one embodiment, for example, the radio node's power allocation is constrained by the limited constellation of possible values for the one or more parameters indicating the power allocated, e.g., as dictated by LTE standards. Moreover, in some embodiments, this limited constellation of possible values presupposes (e.g., was specified based on the assumption that) that the indicated power is to be allocated across the entire operating bandwidth, rather than just a portion of it. Signaling the one or more parameter values without also signaling that referred-to power allocation is restricted to the first portion 24 would constrict the amount of power allocable by the radio node 10. Indeed, a wireless device would have to naively assume that the power has been allocated over the entire operating bandwidth 16, thereby diluting its power allocation estimate and resulting in for instance a link adaptation mismatch. Effectively, then, this would result in unused or wasted power. Embodiments that signal information about the first portion 24 and/or the second portion 26, by contrast, may assist the wireless communication device 12 in accurately determining or estimating power allocation by the radio node 10.

Figure 3:
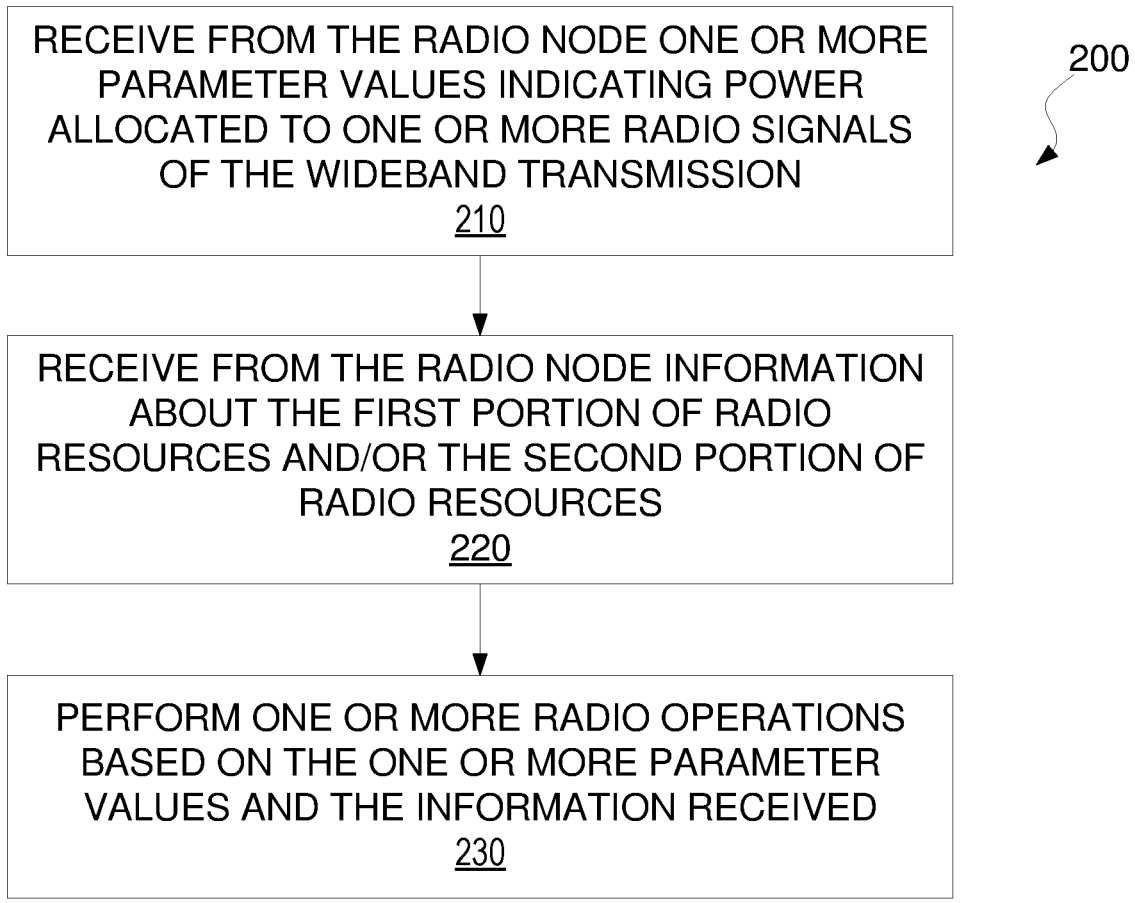
FIG. 3 is a logic flow diagram of a method performed by a wireless communication device according to some embodiments.

FIG. 3 in this regard illustrates corresponding processing performed by the wireless communication device 12 according to one or more embodiments. As shown, processing 200 at the device 12 includes receiving from the radio node 10 one or more parameter values indicating power allocated to one or more radio signals of the wideband transmission 14 (Block 210). Processing 200 also includes receiving from the radio node 10 information about the first portion 24 of radio resources 18 within the wideband operating bandwidth 16 on which power indicated by the one or more parameter values is allocated and/or the second portion 26 of radio resources 18 within the wideband operating bandwidth 16 on which power indicated by the one or more parameter values is not allocated and on which the narrowband transmission 22 is transmitted (Block 220). Processing 200 at the device 12 further includes performing one or more radio operations on the one or more parameter values and the information received (Block 230). These one or more radio operations may comprise, for example, one or more of channel estimation, time tracking and/or frequency tracking, synchronization, demodulation or reception of a data channel, estimation of channel state information, reporting of channel state information, and performing radio measurements.

In one or more embodiments, for example, the device 12 determines power allocated to the one or more radio signals of the wideband transmission 14 per radio resource within the first portion 24, based on the one or more parameter values and the information received. In this case, the device 12 performs the one or more radio operations based on that determination.

Figure 4:
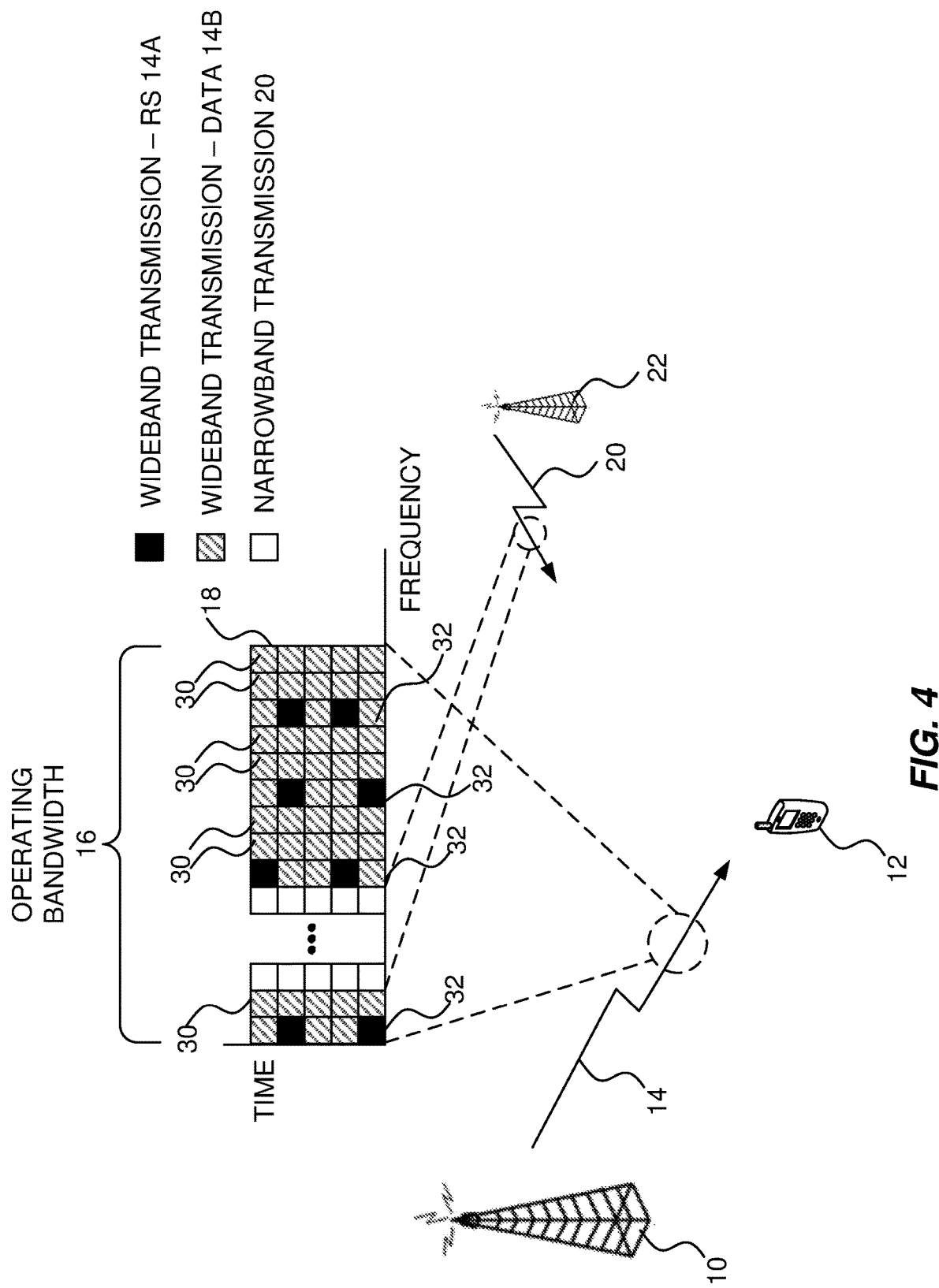
FIG. 4 is a block diagram of a radio node and wireless communication device according to some embodiments.

For example, in one or more embodiments, the wideband transmission 14 comprises a transmission of data and one or more reference signals. FIG. 4 illustrates an example of this. As shown, the wideband transmission 14 comprises one or more reference signals 14A (e.g., cell-specific reference signals, CRS, in an LTE system) and data 14B. FIG. 4 illustrates the reference signal(s) 14A being transmitted on different radio resources (e.g., time-frequency resources) than those one which the data 14B is transmitted.

In some embodiments, the device 12 determines, based on the one or more parameter values and the information received, a first power allocation comprising power allocated to the data 14B at times 30 when the one or more reference signals 14A are not transmitted, per radio resource on which data 14B is transmitted in the first portion 24. In this case, for example, the one or more parameter values may include a first value for a parameter (e.g., $P_A$ in LTE) indicating power allocated to the data 14B at times 30 when the one or more reference signals 14A are not transmitted, and the information received may indicate that the first value indicates power allocated on the first portion 24. This first value may be specific to the device 12. The device 12 alternatively or additionally determines, based on the one or more parameter values and the information received, a second power allocation comprising power allocated to the data at times 32 when the one or more reference signals 14A are transmitted, per radio resource on which data 14B is transmitted. In this case, then, the one or more parameter values may include a second value for a parameter (e.g., $P_B$ in LTE) indicating power allocated to the data 14B at times 30 when the one or more reference signals 14A are transmitted, and the information received may indicate that the second value indicates power allocated on the first portion 24. This second value may be specific to a cell served by the radio node 10. In any event, where the one or more parameter values include a parameter value (e.g., $P_A$ or $P_B$) that indicates power allowed to data 14B included in the wideband transmission 14, the parameter value may indicate the power allocated to the data relative to power allocated to the one or more reference signals 14A included in the wideband transmission 14. Regardless, the device 12 in any such embodiments performs the one or more radio operations based on the first and/or second power allocations.

In at least some embodiments, the device 12 uses the first and/or second power allocations to determine one or more power ratios. Specifically, the device 12 in some embodiments determines a reference signal power allocation comprising power allocated to the one or more reference signals 14A, per radio resource on which the one or more reference signals 14A are transmitted in the first portion 24. The device 12 also determines a first power ratio (e.g., $\rho_A$ in LTE) comprising a ratio of the first power allocation and the reference signal power allocation, and/or determines a second power ratio (e.g., $\rho_B$ in LTE) comprising a ratio of the second power allocation and the reference signal power allocation.

In one or more embodiments, the device 12 performs one or more radio operations that involve determining the SINR of the wideband transmission 14. As one example, the device 12 computes the SINR using the following formula in an LTE (or OFDM) and NB-IoT context:

SINR=Total_DL_Power/Total_Num_Data, where the Total_Num_Data=Number of subcarriers of Type $A$+Number of sub carriers of Type $B$.

Total_DL_Power=ref_signal_power*($\rho_A$*Number of sub carriers of Type $A$+$\rho B$*Number of sub carriers of Type $B$)

For the legacy case say in 10 MHz BANDWIDTH, for one TTI, Number of sub carriers of Type A=4600 and Number of sub carriers of Type B=1200. Assume one NB-IoT system is deployed in the inband, then for one TTI, Number of sub carriers of Type A=4600−12*14=4432 and Number of sub carriers of Type B=1200−12*14=1032. Hence the device 12 will plug in these values to find the SINR based on the received signaling.

In at least some embodiments, the radio node 10 dynamically selects whether or not to perform the processing 100 in FIG. 2, e.g., based on one or more defined rules. When the radio node 10 selects not to perform processing 100 (e.g., in accordance with the "second scheme" described herein), the radio node 10 may allocate power for one or more radio signals of the wideband transmission 12 independent of or irrespective of the power allocated to the narrowband transmission 20. That is, the radio node 10 may disregard or not take into account the narrowband transmission power, e.g., including any power boosting applied thereto. In this case, the radio node 10 may refrain from signaling the information described above about the first portion 24 and/or the second portion 26. The radio node 10 at most just signals that the one or more parameter values indicate power allocated for the wideband transmission 12 across the wideband operating bandwidth 16 in its entirety. The device 12 may therefore remain ignorant of any narrowband transmission 20 transmitted in the in-band or guard-band of the wideband transmission 14.

In one or more embodiments, the radio node 10 performs this dynamic selection based on (i) whether power allocated to the narrowband transmission 20 exceeds a threshold; (ii) how many devices 12 served by the radio node 10 are configured for receiving the signaled information, e.g., as compared to how many devices are not so configured; (iii) how many radio resources 18 are used for the narrowband transmission 20, e.g., as compared to how many radio resources 18 are used for the wideband transmission 14; and/or (iv) how much power is allocated to the one or more radio signals of the wideband transmission 14, e.g., as compared to how much power is allocated to the narrowband transmission 20 (e.g., in terms of power boosting).

In still other embodiments, the radio node 10 selects whether or not to perform processing 100 on a device by device basis, e.g., based on a type of the device and/or whether the device is configured to receiving the signaling.

Figure 5:
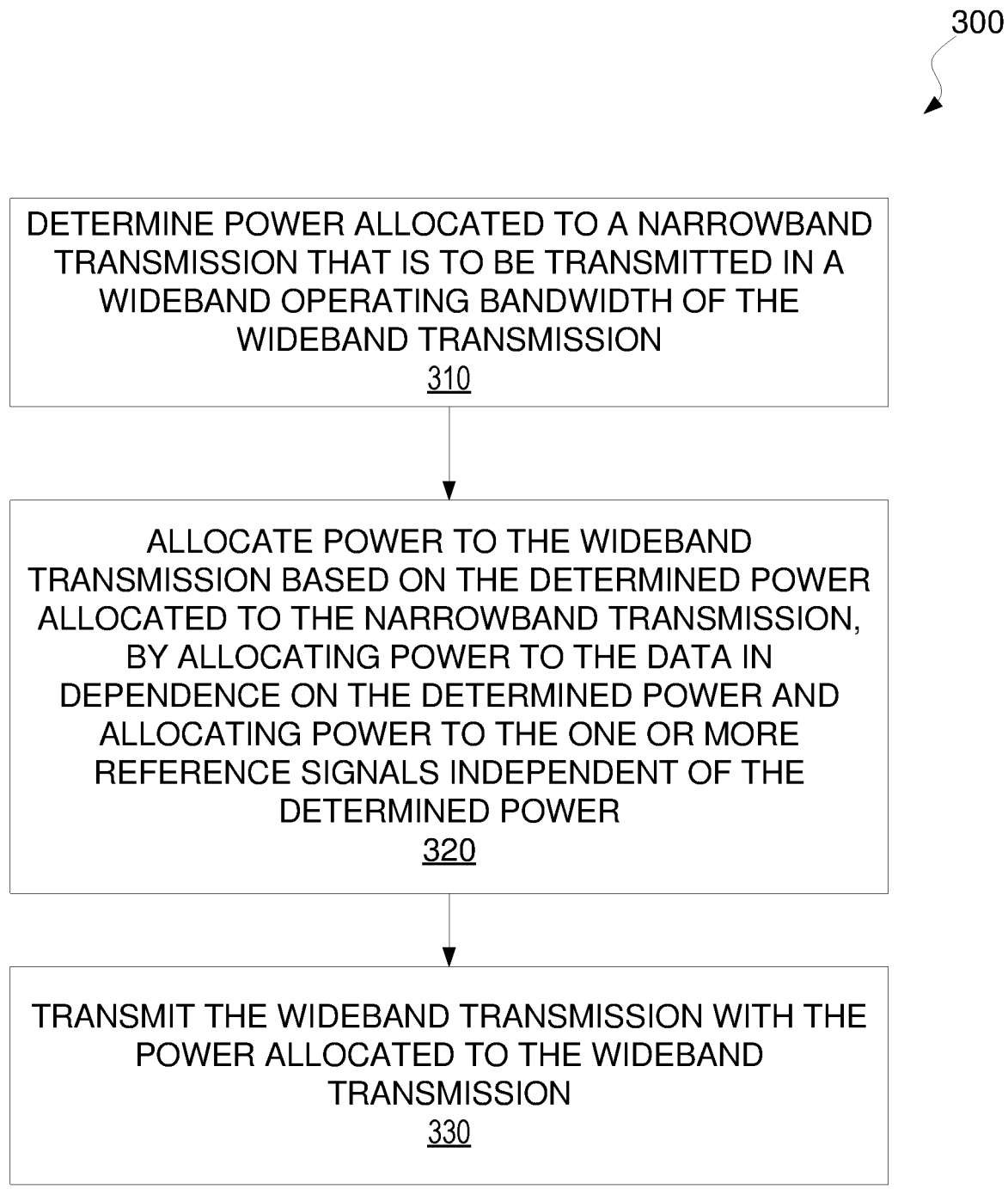
FIG. 5 is a logic flow diagram of a method performed by a radio node according to other embodiments.

The radio node 10 in yet other embodiments alternatively or additionally performs the processing 300 illustrated in FIG. 5 for transmitting a wideband transmission 14 that comprises data 14B and one or more reference signals 14A. As shown, processing 300 includes determining power allocated to the narrowband transmission 20 that is to be transmitted in a wideband operating bandwidth of the wideband transmission 14 (Block 310). Processing 300 further entails allocating power to the wideband transmission 14 based on the determined power allocated to the narrowband transmission 20, by allocating power to the data 14B in dependence on the determined power and allocating power to the one or more reference signals 14A independent of the determined power (Block 320). Processing 300 finally entails transmitting the wideband transmission 14 with the power allocated to the wideband transmission 14 (Block 330).

In at least some embodiments, processing 300 advantageously preserves wideband coverage (e.g., as dictated by the power of the reference signal(s) 14A), despite the narrowband transmission 20 being in the wideband operating bandwidth 16. For example, in one or more embodiments, such processing 300 effectively reduces power allocated to the data 14B (e.g., as compared to if the narrowband transmission 20 was not transmitted in-band), while preserving the power allocated to the one or more reference signals 14A. In some embodiments, such preservation involves allocating (substantially) constant power to the one or more reference signals 14A irrespective of the power allocated to the narrowband transmission 20). In some sense, then, the radio node 10 distributes power reduction necessitated by the narrowband transmission's presence exclusively to the data 14B, so as to preserve the power of the reference signal(s) 14A.

In one or more embodiments, the radio node 10 in this regard reduces power allocated to at least some of the data 14B by an amount that depends on the determined power allocated to the narrowband transmission 20. In some embodiments, this entails reducing power allocated to at least some of the data by the determined power allocated to the narrowband transmission, i.e., by that power in full.

Note that in at least some embodiments, the determined power allocated to the narrowband transmission 20 is expressed as a relative power, e.g., indicating power boosting applied to that transmission 20. Alternatively or additionally, that determined power is expressed as power per radio resource (e.g., power per resource element in LTE). In this case, any power reduction applied to the data 14B may likewise operate on a per radio resource basis.

Embodiments herein also include a radio node 10 configured to perform a combination of processing 100 and processing 300.

Radio resources 18 herein comprise any resources which support a radio transmission thereon. In at least some embodiments, the radio resources 18 are defined at least in part in the frequency domain, e.g., so as to span the operating bandwidth 16. The radio resources 18 may for instance comprise time-frequency resources defined at any granularity or resolution of time and frequency. In LTE based embodiments, for instance, any given radio resource 18 may comprise a resource element (RE) comprising a single OFDM subcarrier during a single OFDM symbol, may comprise a resource block (RB) comprising a group of OFDM subcarriers (e.g., 12) spanning across multiple OFDM symbols (e.g., 7), may comprise a resource block pair comprising a pair of resource blocks, or the like.

Although some embodiments herein are described with the narrowband transmission being dynamically or semi-statically allocable within any part of the operating bandwidth 16, embodiments herein are likewise applicable to static or preconfigured allocations of a narrowband transmission within the operating bandwidth.

The one or more reference signals 14A herein may be any reference signal(s). In some embodiments, though, the reference signal(s) 14A comprise cell-specific reference signals (CRS) in an LTE based system. Similarly, the data 14B herein may comprise any data or payload, e.g., as opposed to reference signals. In LTE based embodiments, for instance, the data comprises PDSCH data, which may comprise so-called "user data" (despite the absence of a "user" in M2M scenarios) and/or control information.

Embodiments described herein are explained in the context of operating in or in association with a base station that communicates over radio communication channels or links with wireless communication devices, also interchangeably referred to as wireless terminals or UEs, using a particular radio access technology. More specifically, embodiments are described in the context of the development of specifications for systems that are or evolve from LTE (including for instance LTE-Advanced). However, it will be appreciated that the techniques may be applied to other wireless networks, as well as to successors of the E-UTRAN. Thus, references herein to signals using terminology from the 3GPP standards for LTE should be understood to apply more generally to signals having similar characteristics and/or purposes, in other networks.

A radio node, as described herein, can be any type of node capable of communicating with another node over radio signals. In the context of the present disclosure, it should be understood that a radio node may be a wireless communication device or a radio network node (e.g., a base station). A wireless device may refer to a machine-to-machine (M2M) device, a machine-type communications (MTC) device, and/or a NB-IoT device. The wireless device may also be a UE, however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless device as described herein may be comprised in a vehicle and may perform monitoring and/or reporting of the vehicle's operational status or other functions associated with the vehicle.

In view of the above modifications and variations, those skilled in the art will appreciate that the radio node 10 herein may be configured to perform as described above by implementing any functional means or units. These means or units may for instance be implemented with respective circuits configured to perform the respective steps illustrated in FIGS. 2 and/or 5.

Figure 6:
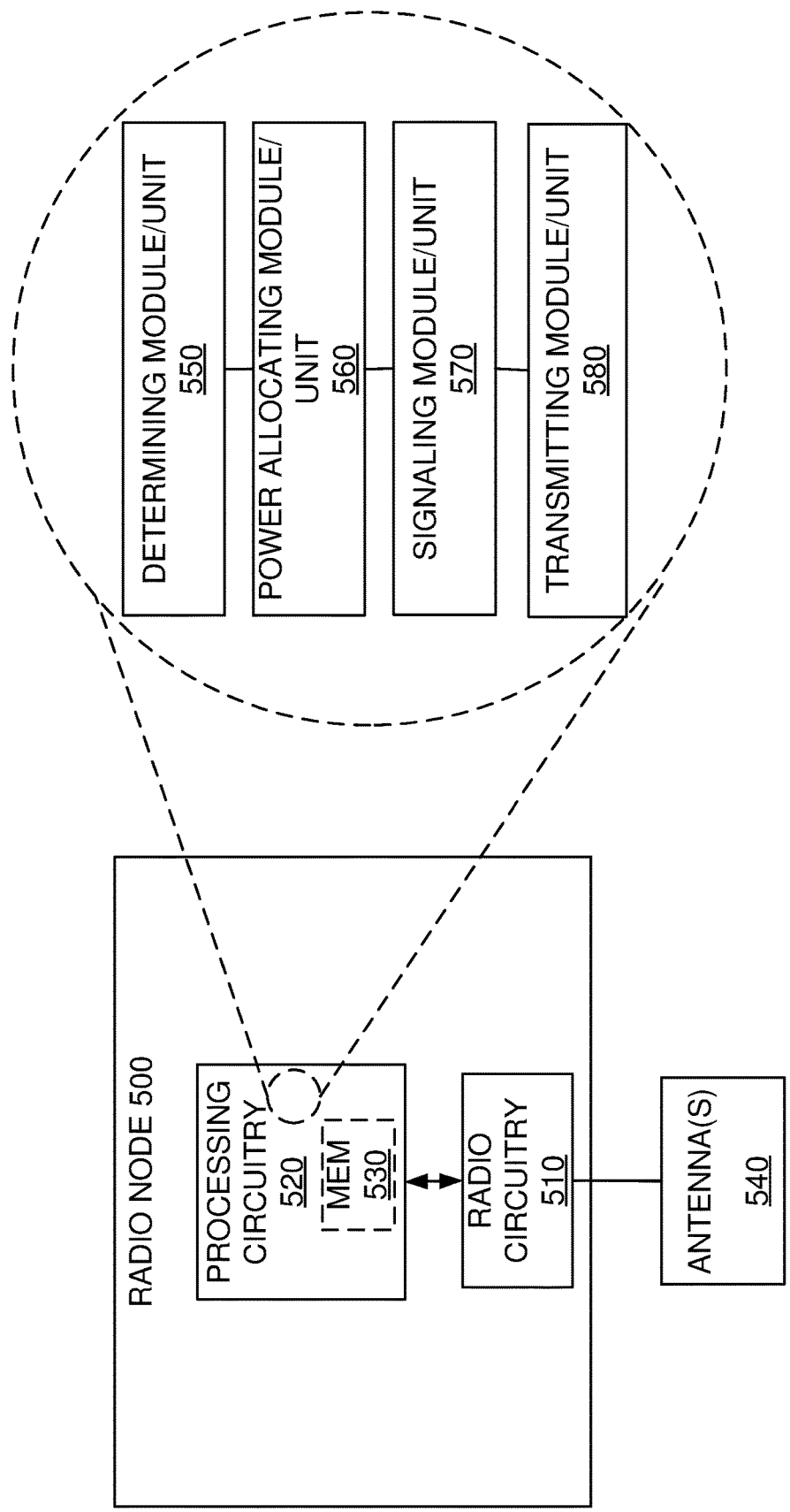
FIG. 6 is a block diagram of a radio node according to some embodiments.

In one embodiment, for example, the radio node 10 is embodied as a radio node that comprises radio circuitry 510 and processing circuitry 520 as shown in FIG. 6. In this case, the radio circuitry 520 may be configured to receive and/or transmit communication data, instructions, and/or messages. It should be appreciated that the radio circuitry 510 may be comprised as any number of transceiving, receiving, and/or transmitting units or circuitry. The radio circuitry 510 may comprise RF circuitry and baseband processing circuitry (not shown).

Via this radio circuitry 510, the processing circuitry 520 is configured, e.g., by executable instructions in memory 530, to determine the first portion 24 of radio resources, allocate power for one or more radio signals of the wideband transmission 14 on the first portion 24, signal the one or more parameter values to the device 12, signal information about the first portion 24 and/or the second portion 26 to the device 12, and transmit the one or more radio signals of the wideband transmission 14 as described above. This transmission may occur via one or more associated antennas 540.

FIG. 6 also correspondingly illustrates certain functional means or units that the radio node 10 implements in this regard. The radio node 10 includes a determining module or unit 550 configured for said determining, a power allocating module or unit 560 configured for said power allocating, a signaling module or unit 570 configured for said signaling, and a transmitting module or unit 580 configured for said transmitting as described above.

Figure 7:
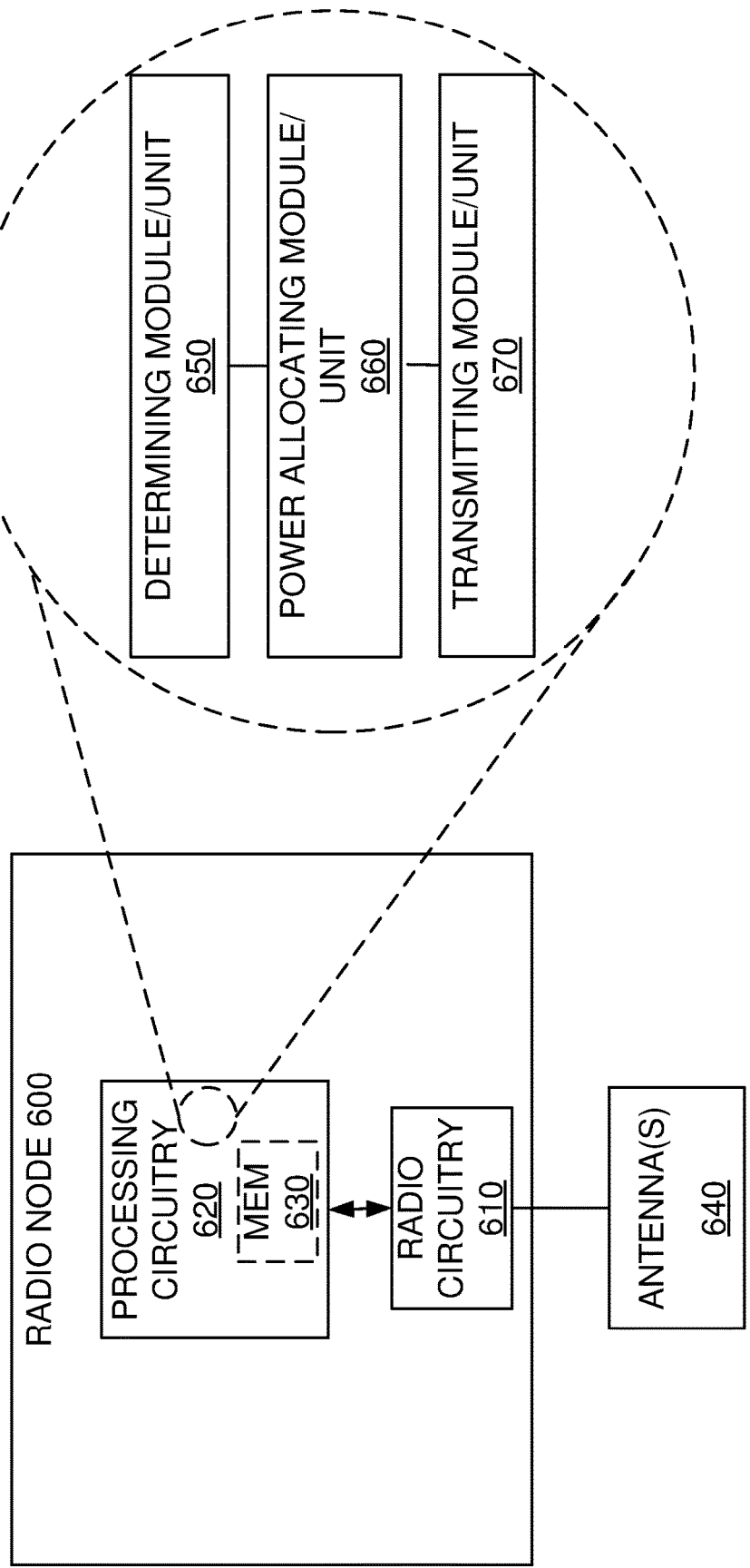
FIG. 7 is a block diagram of a radio node according to other embodiments.

In another embodiment, the radio node 10 is embodied as a radio node that comprises radio circuitry 610 and processing circuitry 620 as shown in FIG. 7. In this case, the radio circuitry 620 may be configured to receive and/or transmit communication data, instructions, and/or messages. It should be appreciated that the radio circuitry 610 may be comprised as any number of transceiving, receiving, and/or transmitting units or circuitry. The radio circuitry 610 may comprise RF circuitry and baseband processing circuitry (not shown). In some examples, the radio node 10 further comprises a network interface (not shown) for communication with one or more base stations and/or a core network.

Via this radio circuitry 610, the processing circuitry 620 is configured, e.g., by executable instructions in memory 630, to determine power allocated to the narrowband transmission 20, allocate power to the wideband transmission 14 based on that determined power (i.e., by allocating power to the data 15B in dependence on that determined power but allocating power to the reference signal(s) 15B independent of that determined power), and to transmit the wideband transmission 14 as described above. This transmission may occur via one or more associated antennas 640.

FIG. 7 also correspondingly illustrates certain functional means or units that the radio node 10 implements in this regard. The radio node 10 includes a determining module or unit 650 configured for said determining, a power allocating module or unit 660 configured for said power allocating, and a transmitting module or unit 670 configured for said transmitting as described above.

Those skilled in the art will also appreciate that the wireless communication device 12 herein may be configured to perform as described above by implementing any functional means or units. These means or units may for instance be implemented with respective circuits configured to perform the respective steps illustrated in FIG. 3.

Figure 8:
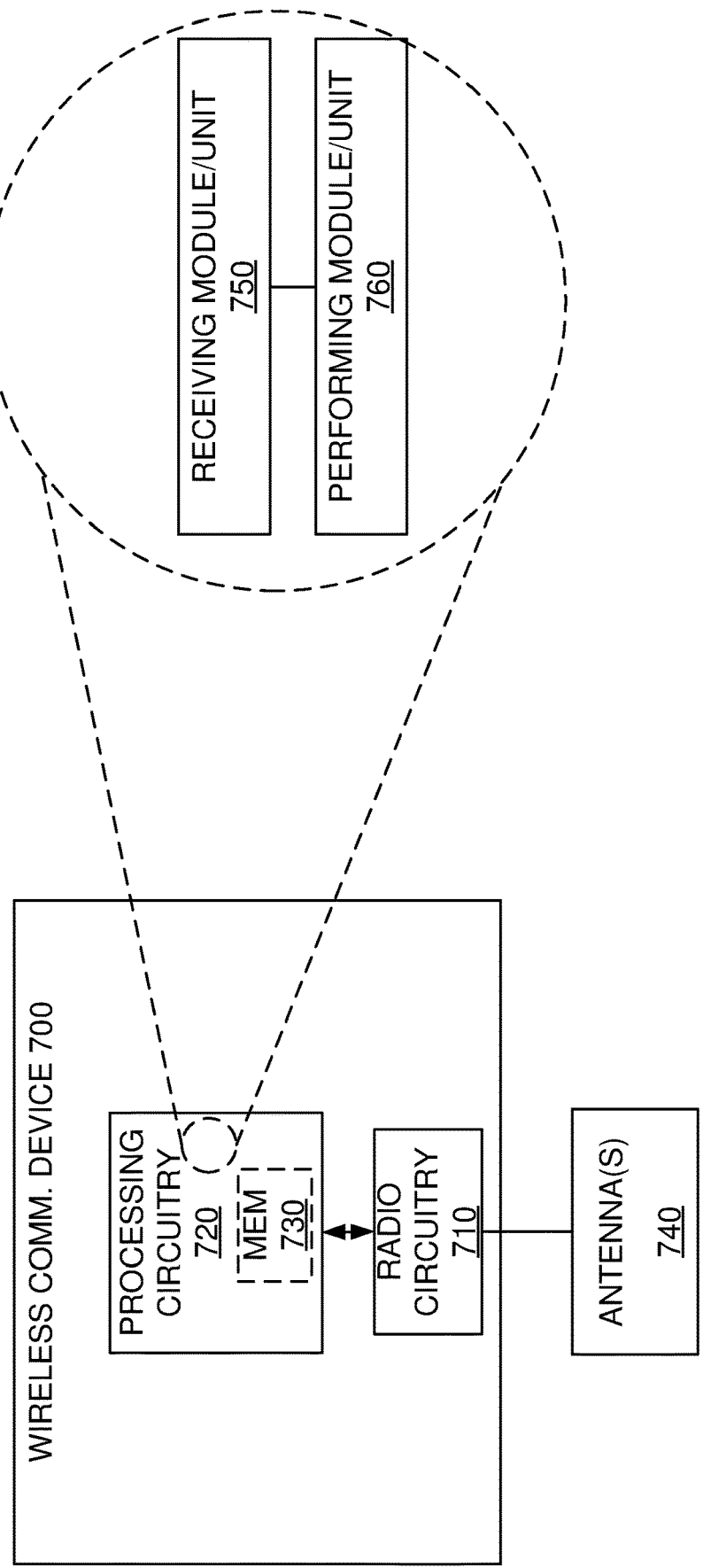
FIG. 8 is a block diagram of a wireless communication device according to some embodiments.

In one embodiment, for example, the wireless communication device 12 is embodied as a device that comprises radio circuitry 710 and processing circuitry 720 as shown in FIG. 8. In this case, the radio circuitry 710 may be configured to receive and/or transmit communication data, instructions, and/or messages. It should be appreciated that the radio circuitry may be comprised as any number of transceiving, receiving, and/or transmitting units or circuitry. The radio 710 may comprise RF circuitry and baseband processing circuitry (not shown).

Regardless, via this radio circuitry 710, the processing circuitry 720 is configured, e.g., by executable instructions in memory 730, to receive the one or more parameter values from the radio node 10, to receive the information about the first portion 24 and/or the second portion 26, and to perform one or more radio operations as described above.

FIG. 8 also correspondingly illustrates certain functional means or units that the wireless communication device 12 implements in this regard. The wireless communication device 12 includes a receiving module or unit 750 for receiving the parameter value(s) and the information, and a performing module or unit 760 for performing radio operation(s) as described above.

The circuits referred to above may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more for carrying out one or more microprocessors, carries out the techniques described herein.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

Figure 9:
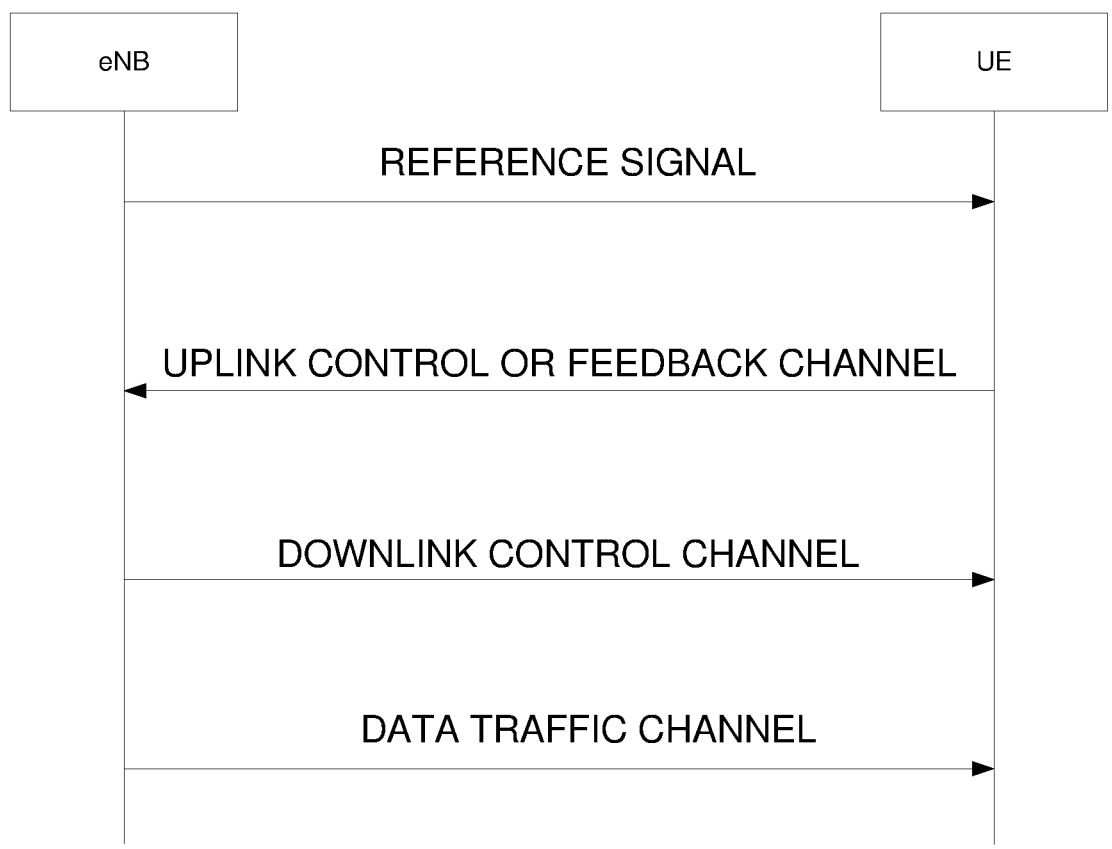
FIG. 9 is a message sequence chart for downlink data transfer in LTE according to some embodiments.

Some embodiments herein are described in the context of LTE. In this context, FIG. 9 shows a message sequence chart for downlink data transfer in LTE. From the pilot or reference signals, the device 12 (shown as a user equipment, UE) computes the channel estimates then computes the parameters needed for channel state information (CSI) reporting. The CSI report consists of for example channel quality indicator (CQI), precoding matrix index (PMI), rank information (RI), the best sub band indices etc.

The CSI report is sent to the radio node 10 in the form of an eNodeB (eNB) via a feedback channel, which may be either PUCCH (periodic CSI reporting) or PUSCH (aperiodic CSI reporting). The eNodeB scheduler uses this information in choosing the parameters for scheduling of this particular UE. The eNodeB sends the scheduling parameters to the UE in the downlink control channel called PDCCH or ePDCCH. After this, the actual data transfer takes place from eNodeB to the UE.

In LTE, the uplink control channel carries information about HARQ-ACK information corresponding to the downlink data transmission, and channel state information. The channel state information typically consists of RI, CQI, and PMI. Either PUCCH or PUSCH can be used to carry this information. Note that the PUCCH reporting is periodic and the periodicity of the PUCCH is configured by the higher layers, while the PUSCH reporting is aperiodic. Also note that there are various modes for PUCCH and PUSCH and in general it depends on the transmission mode and the formats is configured via higher layer signaling.

In LTE, the downlink control channel (PDCCH) carries information about the scheduling grants. Typically this consist of a number of MIMO layers scheduled, transport block sizes, modulation for each codeword, parameters related to HARQ, sub band locations and also PMI corresponding to those sub bands.

For configuring the UE with the information about the transmission power parameters, in LTE the eNodeB determines the downlink transmit energy per resource element. The UE obtains the parameters related to CSI (e.g. CQI, PMI, RI etc) reporting, and PDSCH configuration using RRC signaling [TS 36.331]. The information element (IE) PDSCH-ConfigCommon and the IE PDSCH-ConfigDedicated specifies the common and the UE specific PDSCH configuration respectively. The PDSCH common parameters referenceSignalPower and $P_B$ are common to the all the UEs in a cell. However dedicated parameter such as $P_A$ can be configured differently for each individual UE i.e. UE specific parameters. The parameters referenceSignalPower, $P_A$ and $P_B$ are signaled to the UE via RRC. The RRC signaled parameter, referenceSignalPower, is defined as the linear average over the power contributions (in [W]) of all resource elements that carry cell-specific reference signals within the operating system bandwidth. The ratio of PDSCH Energy Per Resource Element (EPRE) to cell-specific RS EPRE among PDSCH REs for each OFDM symbol is denoted by either $\rho_A$ or $\rho_B$ according to the OFDM symbol index [TS 36.213].

Figure 10:
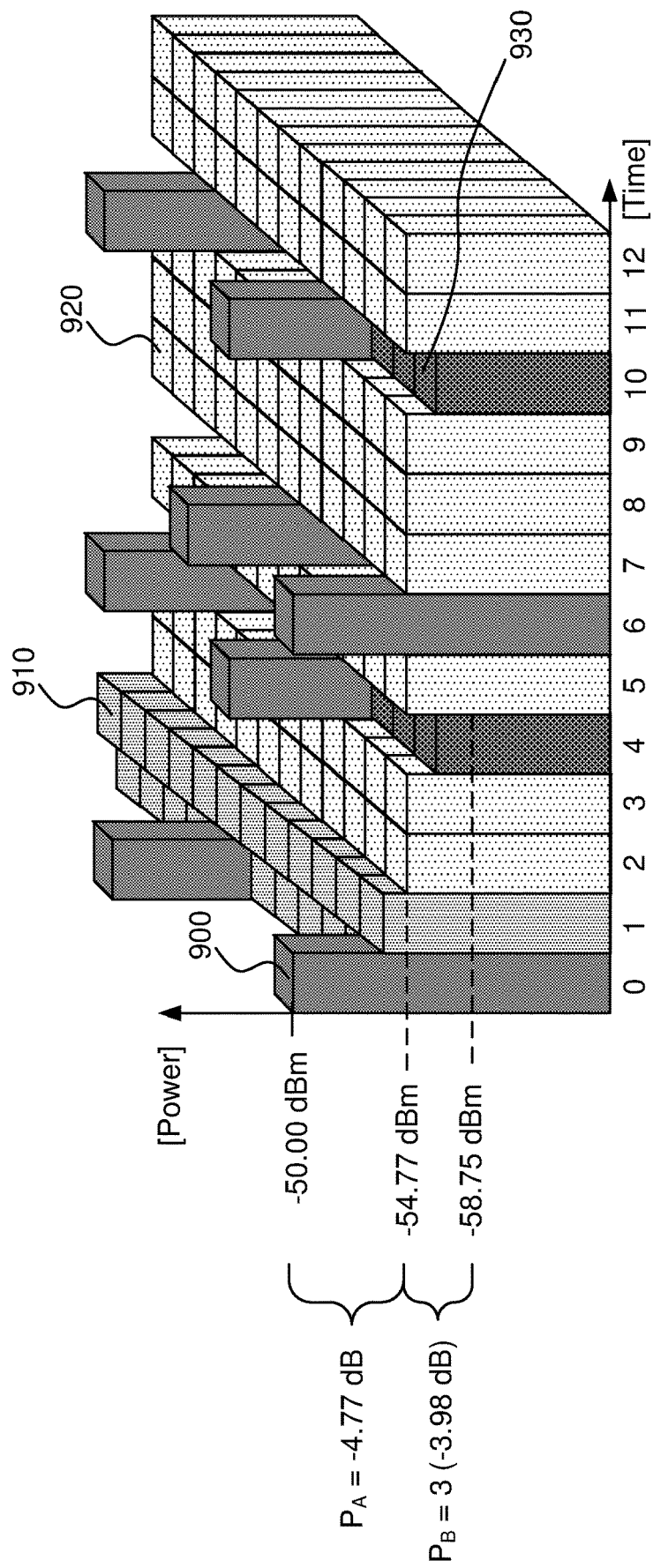
FIG. 10 is a block diagram of downlink transmit power in LTE according to some embodiments.

FIG. 10 shows an example how the UE interprets these parameters. Assume the transmit power 900 of a reference signal (e.g. CRS) in the eNode B is set to −50 dBm and is signalled in SIB Type 2. Also assume that $P_A$=−4.77 dB, which is UE specific, is signalled by higher layers, and specifies the PDSCH transmit power 920 relative to the reference signal transmit power 900 where no reference signals are present. This means that the PDSCH transmit power 920 is −54.77 dBm as shown in FIG. 1. Further assume that $P_B$=−3.98 dB, which is cell specific, is signalled by higher layers, and specifies an additional offset of the PDSCH transmit power 930 relative to the reference signal transmit power 900 where reference signals are present. This means that the PDSCH transmit power 930 is −58.75 as shown in FIG. 10. Then for CSI reporting the UE should assume power $\rho_A=P_A+\Delta_{offset}$ [dB] for PDSCH power on the resource elements where RS is not present and power which depends on $P_B$ and $P_A$ (Table 5.2.1 of TS 36.213) for those resource elements where RS is present. Note that $\Delta_{offset}$ is the offset parameter which is configured by higher-layer signalling and it is constant independent of modulation. Typically $\Delta_{offset}$ is 0 dB. The parameters $\rho_A$ or $\rho_B$, which in turn are derived by the UE based on the downlink power allocation related parameters (referenceSignalPower, $P_A$ and $P_B$), are used by the UE for at least demodulation or reception of data channel (e.g. PDSCH) and CSI estimation and reporting. Also note FIG. 10 shows PDCCH power 910 depending on $\rho_B/\rho_A$.

Although certain embodiments herein are described occasionally in an LTE context, note that terminology such as base station, NodeB or eNode B and UE should be considering non-limiting and does in particular not imply a certain hierarchical relation between the two; in general "NodeB" could be considered as device 1 and "UE" device 2, and these two devices communicate with each other over some radio channel. A generic term network node is used in some embodiments. The network node can be a base station, access point, NodeB or eNode B etc. A generic term wireless device is used in some embodiments. The wireless device can be any type of UE such as D2D UE, MTC UE, M2M UE etc. The MTC or M2M UE may also be interchangeably called as, narrow band or narrow BW UE, category 0 UE, category M UE, low cost and/or low complexity UE etc. Yet another generic term, radio node, may be used in some embodiments. The radio node may be a network node or a wireless device.

In some embodiments, several radio nodes or radio network nodes may be used e.g. first radio node or a first network node, second radio node or second network node, third radio node or third network node etc. In some embodiments the first network node transmits and/or receives signals to one or more UEs using a first RAT. Examples of the first RAT are LTE, HSPA etc. In some embodiments the second network node transmits and/or receives signals to one or more UEs using a second RAT. Examples of the second RAT are NB-IOT, RAT based on narrow bandwidth of LTE, RAT based on narrow bandwidth (e.g. 200 KHz, 180 KHz etc) comprising of OFDMA with 15 KHz of subcarrier spacing in DL and SC-FDMA in UL, RAT based on narrow bandwidth comprising of OFDMA with 3.75 KHz of subcarrier spacing in DL and GMSK in UL etc. Therefore the first RAT and the second RAT operated by the first and the second network nodes respectively are different. The third radio node or the third network node may be neighboring to or connected to the first radio node or the first network node and/or to the second radio node or the second network node. The third network node may operate or serves UEs using the first RAT, second RAT, third RAT or any other RAT.

The UE may operate under either normal coverage or enhanced coverage with respect to its serving cell. The enhanced coverage is also interchangeably called extended coverage. The UE may also operate in a plurality of coverage levels e.g. normal coverage, enhanced coverage level 1, enhanced coverage level 2, enhanced coverage level 3 and so on.

The second RAT may typically operate for supporting MTC capable UEs (e.g. category M UEs, NB-IOT UEs etc). The UEs of the second RAT may operate using a normal and extended coverage. In case of extended/enhanced coverage, the UE may be capable of operating under lower signal quality level (e.g. SNR, SINR, ratio of average received signal energy per subcarrier to total received power per subcarrier (Es/Iot)), RSRQ etc) compared to its capabilities when operating in a legacy systems. The coverage level enhancement may vary with the operational scenario and may also depend on the UE type. For example, a UE which is located in a basement with bad coverage may need larger level of coverage enhancement (e.g. 10 dB) compared to a UE which is at a cell border (e.g. 5 dB).

The coverage level may be expressed in terms of:
  received signal quality and/or received signal strength at the UE wrt its serving cell and/or
  received signal quality and/or received signal strength at the serving cell wrt the UE.

Examples of signal quality are SNR, SINR, CQI, RSRQ etc. Examples of signal strength are path loss, RSRP, SCH_RP etc.

Consider an example of 2 coverage levels defined wrt signal quality (e.g. SNR) at the UE comprising of:
  Coverage enhancement level 1 (CE1) comprising of $SNR \geq -6$ dB at UE wrt its serving cell; and
  Coverage enhancement level 2 (CE2) comprising of $-12$ dB$\leq$SNR$>-6$ dB at UE wrt its serving cell.

Consider another example of 4 coverage levels comprising of:
  Coverage enhancement level 1 (CE1) comprising of $SNR \geq -6$ dB at UE wrt its serving cell;
  Coverage enhancement level 2 (CE2) comprising of $-12$ dB$\leq$SNR$<-6$ dB at UE wrt its serving cell;
  Coverage enhancement level 3 (CE3) comprising of $-15$ dB$\leq$SNR$<-12$ dB at UE wrt its serving cell; and
  Coverage enhancement level 4 (CE4) comprising of $-18$ dB$\leq$SNR$<-15$ dB at UE wrt its serving cell In the above example the CE1 may also be interchangeably called as normal coverage level, baseline coverage level, reference coverage level, legacy coverage level etc. On the other hand CE2-CE4 may be termed as enhanced coverage or extended coverage level.

To realize enhanced coverage of the UE using the second RAT, the second network node may boost the transmit power on signals and/or apply repetition of signals (e.g, same signal is repeated in time and/or frequency resources) transmitted to and/or received from the UE.

In some embodiments a term operating bandwidth (BW) is used. Over the operating BW the network node transmits to and/or receives signals to one or more UEs in a cell. The operating bandwidth is interchangeably called as channel bandwidth, system bandwidth, transmission bandwidth, cell bandwidth, cell transmission BW, carrier bandwidth etc. The operating BW may be expressed in different units. Examples of units are KHz, MHz, number of resource blocks, number of resource elements, number of subcarriers, number of physical channels, number of frequency resource units etc.

Note that, some embodiments are explained assuming NB-IoT is deployed as part of in-band operation. However, the same methods are applicable when NB-IoT is deployed in the guard band, i.e., guard band operation.

Embodiments include methods in a UE and a network node. Two embodiments for example are:
  Methods in a first network node (e.g., radio node 10 in FIG. 1) of a first RAT (e.g., wideband transmission 14) of adapting and transmitting DL power allocation parameters based on in-band operation of second RAT (e.g., narrowband transmission 20) within the operating BW of the first RAT.
  Methods in a UE (e.g., device 12 in FIG. 1) of a first RAT of using the DL power allocation parameters adapted in the first RAT based on in-band operation of second RAT within the operating BW of the first RAT.

Method a First RAT of Adapting and Transmitting DL Power Allocation Parameters Based on In-Band Operation of a Second RAT In this embodiment the first network node (e.g., radio node 10) operates using the first RAT over an operating bandwidth (Bw1) and transmits to and/or receives signals from one or more UEs using the first RAT in a first cell. An example of the first RAT is LTE. Examples of operating bandwidth (Bw1) are 1.4 MHz, 3 MHz, 5 MHz, 10 MHz, 15 MHz, 20 MHz etc.

The second network node (e.g., radio node 22) operates using the second RAT over an operating bandwidth (Bw2) wherein:
  Bw2 is smaller than Bw1 i.e. Bw2<Bw1 and
  Bw2 operates within Bw1
  Examples of Bw2 are 200 KHz, one resource block, 12 subcarriers etc. The second network node may also operate using plurality of channels e.g. 2 or more channels each of 200 KHz.

The operation of the second RAT within the BW of the first RAT is also called as in-band operation, in-bandwidth operation etc. For consistency hereinafter the term in-band operation of the second RAT or simply in-band operation is used, which in turn herein implies that the second RAT operates within the part of the first RAT's BW (i.e. within Bw1).

The second network node may also transmit to and/or receive signals from one or more UEs using the second RAT in a second cell. The first and the second RATs are different. An example of the second RAT is an access technology operating using bandwidth narrower than the BW of the first RAT. For example Bw1 and Bw2 can be 10 MHz (i.e. 50 RBs) and 200 MHz (i.e. 1 RB) respectively.

In some implementation more than one network nodes may operate with the second RAT within the BW, Bw1, of the first RAT e.g. second and third network nodes may operate with the second RAT of bandwidth Bw2 and Bw3 within the bandwidth of the first RAT (i.e. Bw1). The BW parameters, Bw2 and Bw3, can be different (200 KHz and 400 KHz respectively) or they can be the same (e.g. 200 KHz).

In some implementation more than one network node may operate within the BW, Bw1, of the first RAT, wherein each RAT may operate with different RAT. For example the second and third network nodes may operate with the second RAT of bandwidth, Bw2, and the third RAT of bandwidth, Bw3, within the bandwidth of the first RAT (i.e. Bw1). The BW parameters Bw2 and Bw3 can be different (200 KHz and 400 KHz respectively) or they can be the same (e.g. 200 KHz).

For simplicity the embodiments are described for the case of two RATs but the embodiments are applicable for any number of RATs operating within the BW, Bw1, of the first RAT.

The first and the second network nodes can be deployed using different deployment schemes. Examples of such schemes are:
- Both the first and the second network nodes are located in the same site (aka co-located network nodes);
- The first and the second network nodes are non-co-located i.e. they are physically separated;
- The first and the second network nodes are the same i.e. the same network node operates the first and the second RATs. In other words the same network node (e.g. the first network node) may serve UEs in the first cell and also another set of UEs in the second cell.

The first network node uses either a first scheme or a second scheme or both schemes in the first cell for allocating DL power for transmitting signals of the first RAT. These different schemes are described below:

In the first scheme, which is one exemplary embodiment, the method in the first network nodes comprises of the following main steps:

1. Determine that at least some subset of radio resources within the operating bandwidth (Bw1) of the first RAT are being used or operated or expected to be operated by the second RAT.

2. Determine a first set of physical resources which are used or expected to be used by the first RAT for transmitting first radio signals of the first RAT or which are not used or not expected to be used by the second RAT for transmitting second radio signals of the second RAT. For example the first network node determines the information in step #1 and step #2 based on one or more of:
  a. Resources reserved for the operation of the second RAT within Bw1;
  b. request received from the second RAT that it is or is intended to use subset of radio resources (e.g. 1 RB) for the second RAT operation within Bw1;
  c. sending a request to the second network node to indicate if it is or is intended to use subset of radio resources (e.g. 1 RB) for the second RAT operation within Bw1;
  d. autonomously determining that in certain radio resources the first RAT is operating or any RAT different than the first RAT is operating;
  e. autonomously determining that in certain radio resources the transmit power is higher than a certain threshold e.g. power boosting is 10 dB or higher; and
  f. autonomously determining that in certain radio resources the transmit power is higher than a maximum power boosting that can be applied by the first RAT on any of the first set of radio resources e.g. power boosting is 6 dB or higher.

3. Determine based on the available transmit power for the first RAT and the first set of available radio resources, values of one or more DL power allocation parameters (referenceSignalPower, $P_A$ and $P_B$). The DL power allocation parameters may also interchangeably be called DL configuration parameters or DL power configuration parameters. The DL power parameters are used for determining the transmit power of the first set of radio resources for the operation of the first RAT. The first network node determines the power of these parameters by calculating the available power which is not used by the second RAT. For example, if 1 RB is used by the second RAT with power boosting of 10 dB in each resource element (RE) of the RB used by the second RAT, then the first network node will exclude the total power (i.e. 10 dB per RE over 1 RB) when calculating one or more DL power allocation parameters for the first radio resources used by or expected to be used by the first RAT.

4. Transmit the following information to one or more UEs for the operation on the first RAT in the first cell:
  a. Information related to the determined values of the one or more DL power allocation parameters (determined in step #3);
  b. Information about the first set of available resources, which in addition to the downlink power allocation related parameters (e.g. referenceSignalPower, $P_A$ and $P_B$), are to be used by the UE for deriving one or more parameters in order to determine the DL transmit power in different radio resources of the first cell (e.g. $\rho_A$ or $\rho_B$). The determined values of the DL transmit power in the first cell for the first RAT are eventually used by the UE for one or more radio operations involving at least the reception of the signals belonging to the first set of radio resources of the first RAT. Examples of radio operations are channel estimation, time and/or frequency tracking, synchronization, demodulation or reception of data channel (e.g. PDSCH), CSI estimation and reporting, radio measurements etc. The information about the first set of available resources may comprise of for example:
    i. a bit map or a set of indicators, which indicate on which radio resources (e.g. REs, RBs etc.) the DL power allocation parameters are valid for estimating the DL transmit power in the first cell for the first RAT;
    ii. In another example, the first network node may send a bit map or a set of indicator indicating on which radio resources the DL power allocation configuration parameters are not valid. i.e.;
    iii. Any of the above information can be signaled to the UEs using higher layer signaling (e.g. RRC) and/or lower layer signaling (e.g. MAC, L1 channel such as PDCCH, E-PDCCH etc.).

5. Transmit first set of radio signals of the first set of radio resources using the determined DL power allocation parameters in the first cell for the first RAT in step 3.

The first scheme is typically used by the first network node for the new UEs operating with the first RAT in the first cell. The new UEs are those which can receive and use the new messages containing the new information about the resources which are to be considered for calculating the DL transmit power in the first cell.

The first scheme is not transparent to the UEs in the first cell. When the first scheme is used, then the UEs in the first cell may assume that only a subset of radio resources (e.g. 48 RBs in the first cell of 10 MHz) are used for operation of the first RAT, whereas the remaining radio resources (e.g. 2 RBs in 10 MHz) are used for some other RAT e.g. second RAT. In other words the UEs may be aware of the fact that there is an in-band operation of the second RAT within the BW, Bw1, of the first RAT.

In the second scheme, by contrast, a UE computes the transmit power using all radio resources that are used for operation of the first RAT. Accordingly, when determining the DL power allocation parameters' values for the first set of radio resources, the first network node discards (or does not taken into account) the amount of power boosting applied or expected to be applied by the second network node in the second set of radio resources used by the second RAT. In other words the first network node assumes that no power boosting is applied in the second radio resources by the second network node when estimating the transmit power parameters for the first set of radio resources for the operation on the first RAT for the CRS power.

The second scheme is typically used by the first network node for the legacy UEs operating with the first RAT in the first cell. The legacy UEs are those which cannot receive and use the new messages containing the new information about the resources which are to be considered for calculating the DL transmit power in the first cell. The second scheme is transparent to the UEs in sense that the UEs are not aware of any second RAT operation in the first cell. In other words when the second scheme is used, then the UEs in the first cell assume that all radio resources (e.g. all 50 RBs in a cell of 10 MHz) are used for operation of the first RAT. In other words the UEs are not aware of any in-band operation of the second RAT within the BW, Bw1, of the first RAT.

In yet another exemplary embodiment the first network node may use both the first scheme and the second scheme for the allocation and transmission of power in the first cell. For example the first network node may use:
  the first scheme for a first type of UEs operating with the first RAT and
  the second scheme a the second type of UEs operating with the first RAT.

As an example, the first type of UEs are those which can receive and use the new set of information for estimating the DL power used in the first cell e.g. bit map which indicates set of radio resources which should or should not be used for estimating the DL power in the first cell. The new information as described above indicates which subset of radio resources in the first cell are to be considered (or not to be considered) by the UE for estimating the DL transmit power.

As an example, the second type of UEs are those which cannot receive the new set of information and which assume that all radio resources in the first cell are to be used for estimating the DL power transmitted in the first cell. For example, the second type of UEs cannot receive and cannot use a bit map which indicates a set of radio resources which should or should not be used for estimating the DL power in the first cell (as described above).

Selection Between Different Schemes for Allocation and Transmission of Power for the First RAT In this embodiment the first network node decides based on one or more criteria whether to use only the first scheme, only the second scheme, or both schemes in the first cell for operating UEs in the first cell.

Examples of criteria are:
  Amount of power boosting applied in the second set of radio resources for the second RAT: For example if the power boosting for in-band operation is above a threshold (e.g. 4 dB or above) then the first network node may use both the first scheme for the first type of UEs and the second scheme for the second type of UEs for the first RAT operation in the first cell;
  Proportion of the first type of UEs and the second type of UEs of the first RATs in the first cell: For example if vast majority (e.g. 90% or above) of the UEs are of the second type then the first network node may use only the second scheme in the first cell. However if there large number of UEs of both types then the first network node may use both schemes
  Proportion of radio resources used between the first and the second RAT within the BW of the first cell; For example if very few radio resources compared to the total radio resources (e.g. 1 RBs out of 100 RBs used for the second RAT) in the first cell are used for the second RAT, then the first network node may use only the second scheme. Otherwise the first network node may use both schemes;
  Proportion of a first power boosting (P_boost1) applied in the first set of radio resources for the first RAT and a second power boosting (P_boost2) applied in the second set of radio resources for the second RAT within Bw1: The power boosting may also be applied in the first set of radio resources for the first RAT. In one example if the difference in magnitude of the P_boost1 and P_boost2 is within a margin (e.g. 2 dB) then the first network node may use only the second scheme, otherwise it may use both schemes. In yet another example if the P:boost1 equal to or larger than P_boost2 (e.g. 3 dB or more) then the first network node may use only the second scheme;

Signaling of Information About the Selected Scheme(s) and Associated Information About the Allocation and Transmission of Power for the First RAT to Other Network Nodes In this embodiment, the first network node may signal information about the selected one or both schemes used for the power allocation and associated information (e.g. bit map about resources used by the first RAT within BW, Bw1, of the first RAT) to one or more other network nodes. The other network node can be the third network node or any other network node. The other network node may operate with any RAT, which can be any one or more of the first RAT, second RAT, third RAT etc.

The other network node may use the received information for one or more radio operations. Examples of radio operations are:
  Using the information about the DL power allocation (e.g. power allocation parameters) for determining its own one or more transmit power parameters;
  Selecting a set of radio resources for operating another RAT within its BW e.g. using the same resources (e.g. same physical channels such as resource block numbers) for the second RAT operation as used in the first network node. This wills simply the mobility of the UE using RAT when it changes cells since same resources are used for the second RAT in different neighbor cells.

Methods in a UE of a First RAT of Receiving and Using the DL Power Allocation Parameters for Operations In this embodiment the UE operating with the first RAT in the first cell performs the following main steps:

1. obtain (e.g., receive from the first network node) information about the DL power allocation parameters associated with the transmission of radio signals by the first network node with the first RAT (e.g. parameters referenceSignalPower, $P_A$ and $P_B$);

2. obtain (e.g., receive from another node) information about the radio resources which should be used by the UE (or which should not be used by the UE) for estimating or calculating transmit power on the first set of radio signals used for operating the first RAT in the first cell. For example the information may comprise of a bit map of radio resources (as described above) which should or should not be used by the UE for the DL power estimation;

3. estimating or calculating or determining or computing DL transmit power in the first set of radio signals belonging to the first set of radio resources used for the first RAT, based on the information received in the above step #1 and step #2. The DL transmit power may be expressed in terms of the parameters $\rho_A$ or $\rho_B$ as described in sections above. For example, if the eNode B informs not to use resource block #15 for power computations for a 10 MHz bandwidth UE, the UE should not use this resource block in power computations. Hence the number of resource blocks available will be 49 and all the power parameters will be computed using 49 available resource blocks.

4. using the estimated DL transmit power in step #3 above for performing one or more radio operations involving or associated with at least the reception of radio signals of the first RAT in the first cell. Examples of radio operations are channel estimation, time and/or frequency tracking, synchronization, demodulation or reception of data channel (e.g. PDSCH), CSI estimation and reporting, radio measurements etc. Examples of radio measurements are cell identification, RSRP, path loss, RSRQ, SNR, RS-SINR, SINR etc

What is claimed is:

1. A method, implemented by a wireless communication device, the method comprising the wireless communication device:
receiving, from a radio node, one or more parameter values indicating power allocated to one or more radio signals of a wideband transmission received by the wireless communication device, wherein the wideband transmission operates in a wideband operating bandwidth;
receiving, from the radio node, information about at least one of: a first portion of radio resources, within the wideband operating bandwidth, on which power indicated by the one or more parameter values is allocated; and
a second portion of radio resources, within the wideband operating bandwidth, on which power indicated by the one or more parameter values is not allocated and on which a narrowband transmission is transmitted; and
performing one or more radio operations based on the one or more parameter values and the received information,
wherein the wideband transmission comprises a transmission of data and one or more reference signals; and
wherein the method further comprises the wireless communication device:
determining, based on the one or more parameter values and the information received:
a first power allocation comprising power allocated to the data at times when the one or more reference signals are not transmitted, per radio resource on which the data is transmitted; and
a second power allocation comprising power allocated to the data at times when the one or more reference signals are transmitted, per radio resource on which data is transmitted; and performing the one or more radio operations based on the first and second power allocations.

2. The method of claim 1, wherein the one or more radio operations comprise one or more of: channel estimation, time tracking and/or frequency tracking, synchronization, demodulation or reception of a data channel, estimation of channel state information, reporting of channel state information, and performing radio measurements.

3. The method of claim 1, further comprising the wireless communication device:
determining a reference signal power allocation comprising power allocated to the one or more reference signals, per radio resource on which the one or more reference signals are transmitted;
determining a first power ratio comprising a ratio of the first power allocation and the reference signal power allocation, and determining a second power ratio comprising a ratio of the second power allocation and the reference signal power allocation; and
performing the one or more radio operations based on the first and/or second power ratios.

4. A method implemented by a radio node, the method comprising the radio node:
determining, from radio resources within a wideband operating bandwidth, a first portion of the radio resources on which power is to be allocated to one or more radio signals of a wideband transmission;
allocating power to the one or more radio signals of the wideband transmission on the first portion of radio resources;
signaling, to a wireless communication device, one or more parameter values indicating the power allocated to the one or more radio signals of the wideband transmission;
signaling, to the wireless communication device, information about at least one of:
the first portion of radio resources on which power indicated by the one or more parameter values is allocated; and
a second portion of the radio resources on which power indicated by the one or more parameter values is not allocated by the radio node and on which a narrowband transmission is transmitted; and
transmitting the one or more radio signals of the wideband transmission on the first portion of radio resources with the allocated power,
wherein the wideband transmission comprises a transmission of data and one or more reference signals; and
wherein the one or more parameter values comprise:
a first value for a parameter indicating power allocated to the data at times when the one or more reference signals are not transmitted; and
a second value for a parameter indicating power allocated to the data at times when the one or more reference signals are transmitted.

5. The method of claim 1:
wherein the one or more radio signals of the wideband transmission comprise one or more reference signals; and
wherein the one or more parameter values include a parameter value that indicates power allocated to the one or more reference signals included in the wideband transmission.

6. The method of claim 1:
wherein the one or more radio signals of the wideband transmission comprise one or more reference signals; and
wherein the one or more parameter values indicate power allocated to the one or more reference signals included in the wideband transmission, per radio resource.

7. The method of claim 1, wherein the information includes information about the second portion.

8. The method of claim 7, wherein the information indicates a number of radio resources included in the second portion.

9. The method of claim 7, wherein the information indicates a location of the second portion within the wideband operating bandwidth.

10. The method of claim 1, wherein the information includes information about the first portion.

11. The method of claim 10, wherein the information indicates a number of radio resources included in the first portion.

12. The method of claim 10, wherein the information indicates a location of the first portion within the wideband operating bandwidth.

13. The method of claim 1, wherein the information informs the wireless communication device that the power indicated by the one or more parameter values is at least one of:
allocated exclusively for transmission on the first portion; and
not allocated for transmission on the second portion.

14. The method of claim 1, wherein the wideband transmission comprises a transmission of data and one or more reference signals, and wherein the one or more parameter values comprise:
a first value for a parameter indicating power allocated to the data at times when the one or more reference signals are not transmitted;
a second value for a parameter indicating power allocated to the data at times when the one or more reference signals are transmitted.

15. The method of claim 14, wherein the first value is specific to the wireless communication device and the second value is specific to a cell served by the radio node.

16. The method of claim 1, wherein the one or more parameter values include a parameter value that indicates power allocated to data included in the wideband transmission, relative to power allocated to one or more reference signals included in the wideband transmission.

17. The method of claim 1:
wherein the wideband transmission comprises a wideband Long Term Evolution (LTE) transmission; and
wherein the one or more parameter values comprise values for at least one of a referenceSignalPower parameter, a PA parameter, and a PB parameter.

18. The method of claim 4, further comprising the radio node:
determining power allocated to the narrowband transmission on the second portion; and
allocating power for the wideband transmission based on the determined power allocated to the narrowband transmission.

19. The method of claim 18:
wherein the wideband transmission comprises a transmission of data and one or more reference signals; and
wherein the allocating comprises allocating power to the data in dependence on the determined power allocated to the narrowband transmission and allocating power to the one or more reference signals independent of the determined power allocated to the narrowband transmission.

20. A wireless communication device, comprising:
processing circuitry;
memory containing instructions executable by the processing circuitry whereby the wireless communication device is operative to:
receive, from a radio node, one or more parameter values indicating power allocated to one or more radio signals of a wideband transmission, wherein the wideband transmission operates in a wideband operating bandwidth;
receive, from the radio node, information about at least one of: a first portion of radio resources, within the wideband operating bandwidth, on which power indicated by the one or more parameter values is allocated; and
a second portion of radio resources, within the wideband operating bandwidth, on which power indicated by the one or more parameter values is not allocated and on which a narrowband transmission is transmitted; and
perform one or more radio operations based on the one or more parameter values and the received information,
wherein the wideband transmission comprises a transmission of data and one or more reference signals; and
wherein the processing circuitry is further configured to: determine, based on the one or more parameter values and the information received:
a first power allocation comprising power allocated to the data at times when the one or more reference signals are not transmitted, per radio resource on which the data is transmitted; and
a second power allocation comprising power allocated to the data at times when the one or more reference signals are transmitted, per radio resource on which data is transmitted; and performing the one or more radio operations based on the first and/or second power allocations; and
perform the one or more radio operations based on the first and/or second power allocations.

21. A radio node, comprising:
processing circuitry;
memory containing instructions executable by the processing circuitry whereby the radio node is operative to:
determine, from radio resources within a wideband operating bandwidth, a first portion of the radio resources on which power is to be allocated to one or more radio signals of a wideband transmission;
allocate power to the one or more radio signals of the wideband transmission on the first portion of radio resources;
signal, to a wireless communication device, one or more parameter values indicating the power allocated to the one or more radio signals of the wideband transmission;
signal, to the wireless communication device, information about at least one of:
the first portion of radio resources on which power indicated by the one or more parameter values is allocated; and
a second portion of the radio resources on which power indicated by the one or more parameter values is not allocated by the radio node and on which a narrowband transmission is transmitted; and transmit the wideband transmission on the first portion of radio resources with the allocated power, wherein the wideband transmission comprises a transmission of data and one or more reference signals; and wherein the one or more parameter values comprise:

a first value for a parameter indicating power allocated to the data at times when the one or more reference signals are not transmitted; and a second value for a parameter indicating power allocated to the data at times when the one or more reference signals are transmitted.

* * * * *